(12) United States Patent
Hochstetter et al.

(10) Patent No.: US 12,600,832 B2
(45) Date of Patent: Apr. 14, 2026

(54) FIBROUS MATERIAL IMPREGNATED WITH REACTIVE THERMOPLASTIC PREPOLYMER

(71) Applicant: ARKEMA FRANCE, Colombes (FR)

(72) Inventors: Gilles Hochstetter, L'Hay les Roses (FR); Mathieu Capelot, Bernay (FR); Thibaut Savart, Sauvagnon (FR); Arthur Pierre Babeau, Pau (FR); Denis Huze, Fontaine sous Jouy (FR); François Tanguy, Mantes-la-Jolie (FR); Patrice Gaillard, Hagetaubin (FR)

(73) Assignee: ARKEMA FRANCE, Puteaux (FR)

( * ) Notice: Subject to any disclaimer, the term of this patent is extended or adjusted under 35 U.S.C. 154(b) by 479 days.

(21) Appl. No.: 16/624,441

(22) PCT Filed: Jun. 21, 2018

(86) PCT No.: PCT/EP2018/066567
§ 371 (c)(1),
(2) Date: Dec. 19, 2019

(87) PCT Pub. No.: WO2018/234441
PCT Pub. Date: Dec. 27, 2018

(65) Prior Publication Data
US 2020/0216627 A1 Jul. 9, 2020

(30) Foreign Application Priority Data

Jun. 22, 2017 (FR) ........................................ 1755703

(51) Int. Cl.
*C08J 5/24* (2006.01)
*C08L 77/00* (2006.01)

(52) U.S. Cl.
CPC ............... *C08J 5/243* (2021.05); *C08L 77/00* (2013.01); *C08J 2367/00* (2013.01); *C08J 2377/06* (2013.01)

(58) Field of Classification Search
CPC ....... C08J 5/24–249; C08J 2377/00–12; C08L 77/00–12; B05D 1/22; B01J 8/46
See application file for complete search history.

(56) References Cited

U.S. PATENT DOCUMENTS 3,731,724 A * 5/1973 Dorflinger .............. F16B 33/06
470/9
3,742,106 A 6/1973 Price
(Continued)

FOREIGN PATENT DOCUMENTS

CN 88102218 A 11/1988
CN 103313830 A 9/2013
(Continued)

OTHER PUBLICATIONS

International Search Report (PCT/ISA/210) issued on Oct. 1, 2018, by the European Patent Office as the International Searching Authority for International Application No. PCT/EP2018/066564.
(Continued)

*Primary Examiner* — Kregg T Brooks
(74) *Attorney, Agent, or Firm* — Boone IP Law

(57) ABSTRACT

The present invention relates to an impregnated fibrous material comprising a fibrous material made of continuous fibers and at least one reactive thermoplastic prepolymer, and optionally a chain extender, characterized in that the at least one reactive thermoplastic prepolymer is partially polymerized, optionally with the chain extender, and has a number-average molecular weight (Mn) ranging from 500 to 10,000, preferably from 4,000 to 8000, the proportion of fibers in the impregnated fibrous material being 45 to 65%
(Continued)

by volume, preferably 50 to 60% by volume, and in particular 54 to 60%.

18 Claims, 6 Drawing Sheets

(56) References Cited

U.S. PATENT DOCUMENTS

| | | | |
|---|---|---|---|
| 3,940,464 A | 2/1976 | Davis et al. | |
| 3,993,726 A | 11/1976 | Moyer | |
| 4,541,884 A | 9/1985 | Cogswell et al. | |
| 4,549,920 A | 10/1985 | Cogswell et al. | |
| 4,640,861 A | 2/1987 | Binnersley et al. | |
| 4,743,187 A | 5/1988 | Schermutzki | |
| 4,883,625 A | 11/1989 | Glemet et al. | |
| 4,927,583 A * | 5/1990 | Lottiau | C08G 69/16 |
| | | | 425/114 |
| 5,006,373 A | 4/1991 | Woodmansee et al. | |
| 5,171,630 A | 12/1992 | Muzzy et al. | |
| 5,374,385 A | 12/1994 | Binse et al. | |
| 5,614,139 A * | 3/1997 | Cutolo | B05D 7/20 |
| | | | 427/195 |
| 5,624,386 A * | 4/1997 | Tailor | B29C 70/088 |
| | | | 428/110 |
| 6,011,111 A * | 1/2000 | Brennan | C08K 7/04 |
| | | | 524/495 |
| 10,023,737 B2 | 7/2018 | Imai et al. | |
| 2001/0032696 A1 | 10/2001 | Debalme et al. | |
| 2002/0009805 A1 | 1/2002 | Nevo et al. | |
| 2002/0107318 A1* | 8/2002 | Yamada | C08K 3/04 |
| | | | 524/495 |
| 2002/0197397 A1 | 12/2002 | Staheli | |
| 2008/0274355 A1 | 11/2008 | Hewel | |
| 2009/0065130 A1 | 3/2009 | Fram | |
| 2009/0246468 A1 | 10/2009 | Schubiger | |
| 2010/0015332 A1 | 1/2010 | Rollin et al. | |
| 2010/0068518 A1 | 3/2010 | Honma et al. | |
| 2013/0248087 A1 | 9/2013 | Gaillard et al. | |
| 2014/0005331 A1 | 1/2014 | Johnson et al. | |
| 2014/0155540 A1 | 6/2014 | Imai et al. | |
| 2014/0167333 A1 | 6/2014 | Jordan et al. | |
| 2014/0175696 A1 | 6/2014 | Foor et al. | |
| 2014/0316063 A1* | 10/2014 | Hochstetter | B29C 67/246 |
| | | | 264/482 |
| 2015/0126646 A1* | 5/2015 | Hochstetter | C08J 5/24 |
| | | | 156/181 |
| 2015/0258742 A1 | 9/2015 | Hochstetter et al. | |
| 2015/0267050 A1 | 9/2015 | Briffaud et al. | |
| 2015/0273772 A1 | 10/2015 | Cauchois et al. | |
| 2016/0237227 A1 | 8/2016 | Baba | |
| 2016/0326323 A1* | 11/2016 | Hayashi | C08J 5/042 |
| 2016/0346966 A1* | 12/2016 | Gaillard | B29C 43/52 |
| 2016/0347009 A1 | 12/2016 | Gaillard et al. | |
| 2017/0044317 A1 | 2/2017 | Briffaud et al. | |
| 2017/0165875 A1 | 6/2017 | Gaillard et al. | |
| 2017/0247500 A1* | 8/2017 | Tan | C08G 59/066 |
| 2020/0130234 A1 | 4/2020 | Hochstetter et al. | |
| 2020/0139586 A1 | 5/2020 | Hochstetter et al. | |
| 2020/0223102 A1 | 7/2020 | Hochstetter et al. | |

FOREIGN PATENT DOCUMENTS

| | | | |
|---|---|---|---|
| CN | 104010783 A | 8/2014 | |
| CN | 104441323 A | 3/2015 | |
| CN | 104520363 A | 4/2015 | |
| CN | 104884221 A | 9/2015 | |
| CN | 104884503 A | 9/2015 | |
| CN | 106163756 A | 11/2016 | |
| CN | 106414554 A | 2/2017 | |
| CN | 111183008 A | 5/2020 | |
| DE | 1629830 A1 | 1/1971 | |
| EP | 0201367 A1 | 11/1986 | |
| EP | 0287427 A1 | 10/1988 | |
| EP | 0324680 A2 | 7/1989 | |
| EP | 0335186 A2 | 10/1989 | |
| EP | 0406067 A1 | 1/1991 | |
| EP | 0425341 A1 | 5/1991 | |
| EP | 0581641 A1 | 2/1994 | |
| EP | 0581642 A1 | 2/1994 | |
| EP | 0739924 A1 | 10/1996 | |
| EP | 1505099 A2 | 2/2005 | |
| EP | 2146110 A1 | 1/2010 | |
| EP | 2586585 A1 | 5/2013 | |
| EP | 2725055 A1 | 4/2014 | |
| EP | 2934880 A1 | 10/2015 | |
| EP | 3418323 A1 | 12/2018 | |
| EP | 3617254 A1 | 3/2020 | |
| FR | 2991331 A1 | 12/2013 | |
| FR | 2997035 A1 | 4/2014 | |
| FR | 2997036 A1 | 4/2014 | |
| FR | 2997089 A1 | 4/2014 | |
| FR | 3017329 A1 | 8/2015 | |
| FR | 3017330 A1 | 8/2015 | |
| FR | 3019825 A1 | 10/2015 | |
| FR | 3037962 A1 | 12/2016 | |
| FR | 3039554 A1 | 2/2017 | |
| JP | S63-264326 A | 11/1988 | |
| JP | 05-162130 A | 6/1993 | |
| JP | H5-309751 A | 11/1993 | |
| JP | H8-294918 A | 11/1996 | |
| JP | 2013-006353 A | 1/2013 | |
| JP | 2013132890 A | 7/2013 | |
| JP | 2015-501360 A | 1/2015 | |
| JP | 2015-533908 A | 11/2015 | |
| JP | 2016-503094 A | 2/2016 | |
| JP | 2017-507045 A | 3/2017 | |
| KR | 93-0000743 B1 | 1/1993 | |
| KR | 10-2014-0081837 A | 7/2014 | |
| KR | 10-2016-0110445 A | 9/2016 | |
| KR | 10-2016-0146812 A | 12/2016 | |
| WO | 8700387 A1 | 1/1987 | |
| WO | 9220521 A1 | 11/1992 | |
| WO | 9628258 A1 | 9/1996 | |
| WO | 2008135663 A2 | 11/2008 | |
| WO | 2012066241 A2 | 5/2012 | |
| WO | 2014064375 A1 | 5/2014 | |
| WO | 2015/046290 A1 | 4/2015 | |
| WO | 2015121583 A2 | 8/2015 | |
| WO | 2015121584 A2 | 8/2015 | |
| WO | WO-2015121586 A2 * | 8/2015 | B29B 15/122 |
| WO | 2015159016 A1 | 10/2015 | |
| WO | 2016/053465 A | 4/2016 | |
| WO | 2016062896 A1 | 4/2016 | |
| WO | 2016/102481 A1 | 6/2016 | |
| WO | 2017017388 A1 | 2/2017 | |
| WO | 2018115736 A1 | 6/2018 | |
| WO | 2018115737 A1 | 6/2018 | |
| WO | 2018115738 A1 | 6/2018 | |
| WO | 2018115739 A1 | 6/2018 | |

OTHER PUBLICATIONS

International Search Report (PCT/ISA/210) issued on Oct. 4, 2018, by the European Patent Office as the International Searching Authority for International Application No. PCT/EP2018/066561.

Miller, A. et al., "Impregnation Techniques for Thermoplastic Matrix Composites", Polymers and Polymer Composites, pp. 459-481, vol. 4, No. 1, Jan. 1, 1996, XP000658227.

Written Opinion (PCT/ISA/237) issued on Oct. 1, 2018, by the European Patent Office as the International Searching Authority for International Application No. PCT/EP2018/066564.

Written Opinion (PCT/ISA/237) issued on Oct. 4, 2018, by the European Patent Office as the International Searching Authority for International Application No. PCT/EP2018/066561.

"International Search Report (with English Translation) and Written Opinion issued in corresponding International Patent Application No. PCT/EP2018/066555, 13 pages (Jan. 10, 2018)."

Office Action (Notice of Reasons for Refusal) issued on May 11, 2021, by the Japanese Patent Office in Japanese Patent Application No. 2019-569771, and an English Translation of the Office Action. (6 pages).

(56)          References Cited

OTHER PUBLICATIONS

International Search Report (with English Translation) and Written Opinion issued in corresponding International Patent Application No. PCT/EP2018/066567, 21 pages (Sep. 26, 2018).
Decision to grant received for European Patent Application No. 18178988.4, mailed on Jun. 5, 2020, 2 pages.
Decision to grant received for European Patent Application No. 18178989.2, mailed on May 28, 2020, 2 pages.
Decision to grant received for European Patent Application No. 18178990.0, mailed on Apr. 17, 2020, 2 pages.
Decision to grant received for European Patent Application No. 18178994.2, mailed on Oct. 24, 2019, 2 pages.
Decision to grant received for European Patent Application No. 18178995.9, mailed on Jul. 2, 2020, 2 pages.
Decision to grant received for European Patent Application No. 18178996.7, mailed on Jul. 30, 2020, 2 pages.
Decision to grant received for European Patent Application No. 18178998.3, mailed on Apr. 23, 2020, 2 pages.
Decision to grant received for European Patent Application No. 19204501.1, mailed on Jul. 22, 2021, 2 pages.
Decision to Grant received for Japanese Patent Application No. 2019-569770, mailed on Mar. 8, 2022, 5 pages (2 pages of English Translation and 3 pages of Original Document).
Decision to Grant received for Japanese Patent Application No. 2019-569771, mailed on Oct. 12, 2021, 5 pages (2 pages of English Translation and 3 pages of Original Document).
Decision to Grant received for Japanese Patent Application No. 2019-569920, mailed on Mar. 8, 2022, 5 pages (2 pages of English Translation and 3 pages of Original Document).
European Search Report and Search Opinion received for European Application No. 18178988.4, mailed on Nov. 14, 2018, 8 pages.
European Search Report and Search Opinion received for European Application No. 18178989.2, mailed on Nov. 14, 2018, 8 pages.
European Search Report and Search Opinion received for European Application No. 18178990.0, mailed on Nov. 14, 2018, 8 pages.
European Search Report and Search Opinion received for European Application No. 18178994.2, mailed on Oct. 5, 2018, 9 pages.
European Search Report and Search Opinion received for European Application No. 18178995.9, mailed on Nov. 14, 2018, 8 pages.
European Search Report and Search Opinion received for European Application No. 18178996.7, mailed on Nov. 14, 2018, 8 pages.
European Search Report and Search Opinion received for European Application No. 18178998.3, mailed on Nov. 14, 2018, 8 pages.
European Search Report and Search Opinion received for European Application No. 19204501.1, mailed on Jan. 23, 2020, 9 pages.
European Search Report and Search Opinion received for European Application No. 21187016.7, mailed on Dec. 16, 2021, 8 pages.
Intention to grant received for European Patent Application No. 18178988.4, mailed on Apr. 7, 2020, 6 pages.
Intention to grant received for European Patent Application No. 18178989.2, mailed on Apr. 6, 2020, 6 pages.
Intention to grant received for European Patent Application No. 18178990.0, mailed on Feb. 20, 2020, 6 pages.
Intention to grant received for European Patent Application No. 18178994.2, mailed on Oct. 2, 2019, 6 pages.
Intention to grant received for European Patent Application No. 18178995.9, mailed on May 26, 2020, 2 pages.
Intention to grant received for European Patent Application No. 18178996.7, mailed on Apr. 28, 2020, 6 pages.
Intention to grant received for European Patent Application No. 18178998.3, mailed on Mar. 13, 2020, 6 pages.
Intention to grant received for European Patent Application No. 19204501.1, mailed on Jul. 2, 2021, 6 pages.
International Preliminary Report on Patentability received for PCT Patent Application No. PCT/EP18/066555, mailed on Jan. 2, 2020, 17 pages (10 pages of English Translation and 7 pages of Original Document).

International Preliminary Report on Patentability received for PCT Patent Application No. PCT/EP18/066561, mailed on Jan. 2, 2020, 18 pages (9 pages of English Translation and 9 pages of Original Document).
International Preliminary Report on Patentability received for PCT Patent Application No. PCT/EP18/066564, mailed on Jan. 2, 2020, 17 pages (10 pages of English Translation and 7 pages of Original Document).
International Preliminary Report on Patentability received for PCT Patent Application No. PCT/EP18/066567, mailed on Jan. 2, 2020, 21 pages (10 pages of English Translation and 11 pages of Original Document).
Notice of Allowance received for Chinese Patent Application No. 10-2020-7029871, mailed on May 4, 2022, 4 pages (2 pages of English Translation and 2 pages of Original Document).
Notice of Allowance received for Chinese Patent Application No. 201880042039.6, mailed on Oct. 9, 2020, 3 pages (2 pages of English Translation and 1 page of Original Document).
Notice of Allowance received for Chinese Patent Application No. 201880051090.3, mailed on Mar. 22, 2022, 3 pages (2 pages of English Translation and 1 page of Original Document).
Notice of Allowance received for Chinese Patent Application No. 201880052546.8, mailed on Mar. 22, 2022, 3 pages (2 pages of English Translation and 1 page of Original Document).
Notice of Allowance received for Korean Patent Application No. 10-2019-7037896, mailed on Sep. 26, 2020, 4 pages (2 pages of English Translation and 2 pages of Original Document).
Notice of Allowance received for Korean Patent Application No. 10-2020-7001696, mailed on Sep. 27, 2021, 4 pages (2 pages of English Translation and 2 pages of Original Document).
Notice of Allowance received for Korean Patent Application No. 10-2020-7002365, mailed on Oct. 5, 2021, 4 pages (2 pages of English Translation and 2 pages of Original Document).
Notice of Allowance received for Korean Patent Application No. 10-2021-7035217, mailed on Aug. 2, 2022, 4 pages (2 pages of English Translation and 2 pages of Original Document).
Office Action (Notice of Reasons for Refusal) issued on Mar. 10, 2021, by the Japanese Patent Office in corresponding Japanese Patent Application No. 2019-569770, and an English Translation of the Office Action. (8 pages).
Office Action received for Chinese Patent Application No. 201880041962.8, mailed on Oct. 29, 2021, 17 pages (9 pages of English Translation and 8 pages of Original Document).
Office Action received for Chinese Patent Application No. 201880042039.6, mailed on Jul. 3, 2020, 11 pages (6 pages of English Translation and 5 pages of Original Document).
Office Action received for Chinese Patent Application No. 201880051090.3, mailed on Jun. 17, 2021, 20 pages (10 pages of English Translation and 10 pages of Original Document).
Office Action received for Chinese Patent Application No. 201880052546.8, mailed on Jun. 28, 2021, 21 pages (11 pages of English Translation and 10 pages of Original Document).
Office Action received for European Application No. 18178990.0, mailed on May 28, 2019, 6 pages.
Office Action received for European Application No. 18178994.2, mailed on Mar. 13, 2019, 4 pages.
Office Action received for European Application No. 18178998.3, mailed on May 28, 2019, 6 pages.
Office Action received for European Application No. 18733251.5, mailed on Apr. 17, 2023, 3 pages.
Office Action received for European Application No. 18733251.5, mailed on Aug. 17, 2022, 4 pages.
Office Action received for European Application No. 18733251.5, mailed on Feb. 1, 2021, 3 pages.
Office Action received for European Application No. 18733251.5, mailed on Jan. 27, 2022, 3 pages.
Office Action received for European Application No. 18733251.5, mailed on Jul. 28, 2021, 3 pages.
Office Action received for European Application No. 19204501.1, mailed on Feb. 25, 2021, 3 pages.
Office Action received for European Application No. 21187016.7, mailed on Apr. 19, 2023, 5 pages.

(56)         References Cited

OTHER PUBLICATIONS

Office Action received for Japanese Patent Application No. 2019-569770, mailed on Mar. 16, 2021, 8 pages (4 pages of English Translation and 4 pages of Original Document).

Office Action received for Japanese Patent Application No. 2019-569770, mailed on Sep. 7, 2021, 6 pages (3 pages of English Translation and 3 pages of Original Document).

Office Action received for Japanese Patent Application No. 2019-569771, mailed on Jan. 5, 2021, 8 pages (4 pages of English Translation and 4 pages of Original Document).

Office Action received for Japanese Patent Application No. 2019-569771, mailed on May 11, 2021, 6 pages (3 pages of English Translation and 3 pages of Original Document).

Office Action received for Japanese Patent Application No. 2019-569771, mailed on Sep. 15, 2020, 8 pages (4 pages of English Translation and 4 pages of Original Document).

Office Action received for Japanese Patent Application No. 2019-569920, mailed on Jan. 11, 2022, 4 pages (2 pages of English Translation and 2 pages of Original Document).

Office Action received for Japanese Patent Application No. 2019-569920, mailed on Jan. 26, 2021, 12 pages (6 pages of English Translation and 6 pages of Original Document).

Office Action received for Japanese Patent Application No. 2019-569920, mailed on Sep. 14, 2021, 6 pages (3 pages of English Translation and 3 pages of Original Document).

Office Action received for Japanese Patent Application No. 2019-570413, mailed on Feb. 7, 2023, 6 pages (3 pages of English Translation and 3 pages of Original Document).

Office Action received for Japanese Patent Application No. 2019-570413, mailed on Jun. 28, 2022, 18 pages (9 pages of English Translation and 9 pages of Original Document).

Office Action received for Japanese Patent Application No. 2021-181914, mailed on May 23, 2023, 6 pages (3 pages of English Translation and 3 pages of Original Document).

Office Action received for Japanese Patent Application No. 2021-181914, mailed on Nov. 29, 2022, 6 pages (3 pages of English Translation and 3 pages of Original Document).

Office Action received for Korean Patent Application No. 10-2019-7037896, mailed on Feb. 21, 2020, 15 pages (8 pages of English Translation and 7 pages of Original Document).

Office Action received for Korean Patent Application No. 10-2019-7037896, mailed on Jun. 20, 2020, 6 pages (3 pages of English Translation and 3 pages of Original Document).

Office Action received for Korean Patent Application No. 10-2020-7001696, mailed on Mar. 26, 2021, 14 pages (8 pages of English Translation and 6 pages of Original Document).

Office Action received for Korean Patent application No. 10-2020-7002365, mailed on Jan. 26, 2021, 22 pages (12 pages of English Translation and 10 pages of Original Document).

Office Action received for Korean Patent Application No. 10-2020-7002365, mailed on Jul. 27, 2021, 7 pages (4 pages of English Translation and 3 pages of Original Document).

Office Action received for Korean Patent Application No. 10-2020-7002368, mailed on Dec. 12, 2022, 9 pages (5 pages of English Translation and 4 pages of Original Document).

Office Action received for Korean Patent Application No. 10-2020-7029871, mailed on Nov. 17, 2021, 5 pages (3 pages of English Translation and 2 pages of Original Document).

Office Action received for Korean Patent Application No. 10-2021-7035217, mailed on May 19, 2022, 7 pages (4 pages of English Translation and 3 pages of Original Document).

Office Action received for Korean Patent Application No. 10-2021-7035217, mailed on Nov. 15, 2021, 18 pages (10 pages of English Translation and 8 pages of Original Document).

Second Action received for Chinese Patent Application No. 201880041962.8, mailed on Mar. 23, 2022, 17 pages (10 pages of English Translation and 7 pages of Original Document).

Second Office Action received for Chinese Patent Application No. 201880051090.3, mailed on Dec. 9, 2021, 7 pages (4 pages of English Translation and 3 pages of Original Document).

Third Office Action received for Chinese Patent Application No. 201880041962.8, mailed on Jun. 24, 2022, 15 pages (9 pages of English Translation and 6 pages of Original Document).

* cited by examiner

FIBROUS MATERIAL IMPREGNATED WITH REACTIVE THERMOPLASTIC PREPOLYMER

FIELD OF THE INVENTION

The present invention relates to a fibrous material impregnated with reactive thermoplastic prepolymer having a low number-average molecular weight, Mn.

More specifically, the invention relates to a fibrous material impregnated with at least one reactive thermoplastic prepolymer and optionally a chain extender, wherein said at least one reactive thermoplastic prepolymer is partially polymerized, optionally with said chain extender, and has a number-average molecular weight Mn from 500 to 10,000, preferably from 4,000 to 8,000, and a fiber level in said impregnated fibrous material from 45 to 65% by volume, preferably from 50 to 60% by volume, in particular from 54 to 60% by volume.

In the present description, "fibrous material" is understood to mean an assembly of reinforcing fibers. Before forming, it has the form of rovings. After forming, it has the form of strips (or tape), or layers. When the reinforcing fibers are continuous, the assembly thereof makes a unidirectional reinforcement or a woven or nonwoven textile (NCF). When the fibers are short, assembly thereof makes a felt or fiber mat.

Such impregnated fibrous materials are in particular intended for implementing lightweight composite materials for the production of mechanical parts having a three-dimensional structure and having good mechanical and thermal properties. When the fibers are carbon or the resin is filled with suitable additives, these fibrous materials are capable of dissipating electrostatic charges. The use of fire-resistant resins or fire-resistant additives in resins that are not fire-resistant allows impregnated fibrous materials to be fire-resistant. They therefore have properties compatible with production of parts in particular in the mechanical, aeronautic, naval, automobile, oil and gas, in particular offshore, gas storage, energy, health and medical, sports and recreation, and electronics fields.

Such impregnated fibrous materials are also called composite materials. They comprise the fibrous material, made up of reinforcing fibers, and the matrix formed of the polymer impregnating the fibers. The first role of this material is to keep the reinforcing fibers in a compact shape and to give the final product the desired shape. This matrix also transfers the load between the fibers and therefore improves the mechanical resistance of the composite. Such a matrix also serves to protect the reinforcing fibers against abrasion and an aggressive environment, to control the surface appearance and to disperse possible loads among the fibers. The role of this matrix is important for the long-term resistance of the composite material, in particular as it relates to fatigue and flow.

PRIOR ART

Good quality three-dimensional composite parts produced from impregnated fibrous materials generally follows from mastery of the method for impregnating the reinforcing fibers with thermoplastic polymer and therefore of the resulting impregnated fibrous material.

In the present description, the term "strip" is used to denote strips of fibrous material whose width is greater than or equal to 400 mm. The term "ribbon" is used to denote ribbons whose calibrated width is less than or equal to 400 mm.

The term "roving" is also used to denote the fibrous material.

Until now, strips of fibrous material reinforced by impregnating with thermoplastic polymer or thermosetting polymer were produced according to several methods which depend in particular on the nature of the polymer, the type of desired final composite material and the field of application thereof, where some of these methods were made of an impregnation step followed by a hot calendering step of the impregnated fibrous material or a drying step which could be followed by a step of melting the thermoplastic polymer.

Thus the technologies for impregnating in wet route or by means of a liquid or very low viscosity precursor, polymerizing in situ, are often used for impregnating reinforcing fibers by thermosetting polymers, like epoxy resins for example, as described in the patent WO 2012/066241A2. These technologies are generally not directly applicable to impregnating with thermoplastic polymers because these rarely have liquid precursors.

The methods for impregnating by crosshead extrusion of a molten polymer are only suited for the use of low viscosity thermoplastic polymers. Thermoplastic polymers, specifically those with high glass transition temperature, have a molten state viscosity too high to allow satisfactory impregnation of fibers, and good quality semifinished or finished products.

International application WO 2014/064375 describes a method for manufacturing a thermoplastic composite material, in particular a mechanical part or a structural part with based on said material, comprising a step for implementing or molding of a nonreactive polyamide composition after impregnation of a fibrous material in order to form the final composite part in a mold or with another implementation system, or else a step for impregnation in the molten state of a fibrous material with a reactive prepolymer composition and implementation by molding or another implementation system simultaneously with a step for polymerization of the reactive composition. Said implementation can be done according to a RTM, S-RIM, injection-compression, pultrusion or infusion method.

However, these methods require a substantial and energy-intensive cycle time.

Furthermore, when the reactive polymer has a temperature Tg or Tf close to the Tf or Tg of the final polymer, the prepolymer begins to polymerize before the injection is complete, generating defects in the part (lack of material, lack of homogeneity of thermal mechanical properties of the component polymer, etc.).

The invention therefore aims to address at least one of the drawbacks of the prior art, and in particular aims to obtain fibrous material impregnated with reactive thermoplastic prepolymer subsequently making it possible to prepare a composite material impregnated with a non-reactive thermoplastic polymer, in particular a mechanical part or a structural part based on said material, with a short cycle time, in particular in the order of a minute for thermostamping, a lower energy cost than the prior art, and the use of simpler equipment and therefore a lower equipment investment.

The invention in particular aims to propose a fibrous material impregnated with a reactive thermoplastic prepolymer, having a fiber level in said impregnated fibrous material from 45 to 65% by volume, preferably from 50 to 60% by volume, in particular from 54 to 60% and able to react subsequently during its implementation in order to later obtain a fibrous material impregnated by a nonreactive thermoplastic polymer and having mechanical performance levels necessary for the final composite part.

BRIEF DESCRIPTION OF THE INVENTION

To that end, the invention relates to an impregnated fibrous material comprising a fibrous material of continuous fibers and at least one reactive thermoplastic prepolymer, and optionally a chain extender, wherein said at least one reactive thermoplastic prepolymer is partially polymerized, optionally with said chain extender, and has a number-average molecular weight Mn from 500 to 10,000, preferably from 4,000 to 8,000, the proportion of fibers in said impregnated fibrous material being 45 to 65% by volume, preferably 50 to 60% by volume, and in particular 54 to 60% by volume.

The reactive thermoplastic prepolymer is a non-reactive thermoplastic polymer precursor.

The expression "reactive thermoplastic prepolymer" means that the molecular weight of said reactive prepolymer will change during its subsequent implementation by a reaction of reactive prepolymers with one another through condensation with release of water or by substitution or reaction of reactive prepolymers with a chain extender by polyaddition and without elimination of volatile byproducts to subsequently lead, after implementation, to the nonreactive final thermoplastic polymer of the thermoplastic matrix.

The expression "non-reactive final thermoplastic polymer" means that the final thermoplastic polymer has a molecular weight that is no longer likely to change significantly, i.e. that its number-average molecular weight (Mn) changes by less than 50% when it is used and therefore corresponding to the final polymer of the thermoplastic matrix.

The expression "partially polymerized" means that the prepolymers have an initial number-average molecular weight Mn, and an initial molten viscosity $\eta_1$ corresponding to the molecular weight and the viscosity obtained during their preparation.

During the impregnation of the fibrous material, this weight changes by partial reaction of the thermoplastic prepolymers, with one another or with the chain extender, which means that the number-average molecular weight $Mn_2$ and the molten viscosity $\eta_2$ of the prepolymer after impregnation are greater than or equal to the initial molecular weight $Mn_1$, and an initial molten viscosity $\eta_1$.

Said partially polymerized reactive prepolymers, optionally with the chain extenders, have a number-average molecular weight ($Mn_2$) ranging from 500 to 10,000, preferably from 4,000 to 8,000.

This number-average molecular weight of course refers to the solid state after cooling of the prepolymer.

Said nonreactive final thermoplastic polymer is derived from a reactive thermoplastic prepolymer that may or may not comprise a chain extender or a polymerization of a mixture of reactive prepolymers, optionally a prepolymer with the chain extender. The number-average molecular weight Mn of said nonreactive final polyamide polymer is greater than 10,000, preferably in a range from 10,000 to 40,000, preferably from 12,000 to 30,000, determined in particular by the calculation from the level of terminal functions determined by potentiometric titration in solution and the functionality of said prepolymers or by NMR assay (Poastma et al. (Polymer, 47, 1899-1911 (2006)).

Advantageously, said impregnated fibrous material is inflexible.

Since the impregnation in the method from the invention is done to the core, it makes the impregnated fibrous material inflexible in contrast with the impregnated fibrous materials of the art in which the impregnation is partial, which results in a flexible fibrous material.

Advantageously, said at least one partially polymerized reactive thermoplastic prepolymer, optionally with said chain extender, has a molten viscosity from 0.1 to 100 Pa.s, The molten viscosity is measured by oscillatory rheology at a temperature $Tf \le T \le Tf+50°$ C., at 10 rad/sec under nitrogen flushing with 5% deformation on a Physica MCR301 apparatus between two parallel planes with a diameter of 25 mm.

The partially polymerized prepolymer, optionally with said chain extender, has a low number-average molecular weight Mn or a molten viscosity of 0.1 to 100 Pa.s, which means that this prepolymer and optionally the chain extender have a low viscosity and therefore a high fluidity thus allowing good impregnation of said fibrous material on both surfaces and at the core of said fibrous material.

Nevertheless, the impregnation on both surfaces does not necessarily mean that the impregnation is similar on both surfaces of said fibrous material. Indeed, the impregnation can lead to an impregnated material having a zone rich in thermoplastic prepolymer and optionally a chain extender on one surface of said material and a zone rich in fibers on the opposite surface of said material, which therefore means that the material impregnated with prepolymer is asymmetrical.

Advantageously, the proportion of fibers by volume is constant in at least 70% of the volume of the strip or ribbon, in particular in at least 80% of the volume of the strip or ribbon, in particular in at least 90% of the volume of the strip or ribbon, more particularly in at least 95% of the volume of the strip or ribbon.

Advantageously, the distribution of fibers is homogeneous in at least 95% of the volume of the strip or ribbon.

The term "homogeneous" means that the impregnation is uniform and that there are no dry fibers, meaning fibers that are not impregnated, in at least 95% of the volume of the strip or ribbon of impregnated fibrous material.

The fiber level is measured by volume locally on a representative elemental volume (REV).

The term "constant" indicates that the fiber level by volume is constant up to the measurement uncertainty which is approximately 1%.

Advantageously, the impregnation by the prepolymer is homogeneous and to the core.

Thermoplastic Prepolymer

Thermoplastic, or a thermoplastic pre-polymer, is understood to mean a material, generally solid at room temperature, which can be semicrystalline or amorphous, and which softens during a temperature increase, in particular after passing the glass transition temperature (Tg) thereof and flows at higher temperature when it is amorphous, or showing a clear melting on passing through the melting point (Tm) thereof when it is semicrystalline, and which returns to a solid when the temperature drops below the crystallization temperature thereof (if semicrystalline) and below the glass transition temperature thereof (if amorphous).

Tg and Tm are determined by differential calorimetric analysis (DSC) according to the standards 11357-2: 2013 and 11357-3: 2013, respectively.

Throughout the description, the expressions "prepolymer", "thermoplastic prepolymer", "reactive thermoplastic prepolymer" or "partially polymerized reactive thermoplastic prepolymer" are used and refer to the same compound.

As for the prepolymer making up the impregnation matrix for the fibrous material, it is advantageously a thermoplastic prepolymer or a mixture of thermoplastic prepolymers. This prepolymer or mixture of thermoplastic prepolymers can be crushed into powder form in order to be usable in a device such as a tank, in particular in a fluidized bed or in an aqueous dispersion. The device, in tank form, in particular fluidized bed form, can be open or closed.

The molecular weight ranges indicated hereinabove are therefore also valid for $Mn_1$, or $Mn_2$, which means that $Mn_2$ is never greater than 10,000.

The Mn are in particular determined by the calculation of the level of terminal functions determined by potentiometric titration in solution and the functionality of said prepolymers. The masses Mn can also be determined by steric exclusion chromatography or by NMR.

According to a first possibility, said at least partially polymerized reactive thermoplastic prepolymer comprises at least one reactive (polyamide) prepolymer carrier on the same chain (that is to say, on the same prepolymer), two terminal functions X' and Y' that are respectively co-reactive with one another by condensation, with X' and Y' being amine and carboxy or carboxy and amine, respectively.

Advantageously, said at least partially polymerized reactive thermoplastic prepolymer is constituted by at least one reactive prepolymer carrying on the same chain two terminal functions X' and Y', functions that respectively reactive together by condensation, with X' and Y' being amine and carboxyl or carboxyl and amine respectively.

There is therefore no chain extender present in this first embodiment.

According to a second possibility, said at least partially polymerized reactive thermoplastic prepolymer comprises at least two polyamide prepolymers that react together and each carry respectively two identical terminal functions X' or Y' (identical for the same prepolymer and different between the two prepolymers), where said function X' of a prepolymer can react only with said function Y' of the other prepolymer, particularly by condensation, more particularly with X' and Y' being amine and carboxyl or carboxyl and amine respectively.

Advantageously, said at least partially polymerized reactive thermoplastic prepolymer is constituted by at least two polyamide prepolymers that react together and each carry respectively two identical terminal functions X' or Y' (identical for the same prepolymer and different between the two prepolymers), where said function X' of a prepolymer can react only with said function Y' of the other prepolymer, particularly by condensation, more particularly with X' and Y' being amine and carboxyl or carboxyl and amine respectively.

The at least two prepolymers may or may not be mixed together beforehand.

This condensation (or polycondensation) reaction may cause the elimination of by-products. These can be eliminated by working preferably according to a process that uses open mold technology. In the case of process with a closed mold, a step of degassing, preferably under vacuum, of the by-products eliminated by the reaction is present, to prevent the formation of microbubbles of by-products in the final composite material, which (the microbubbles) may affect the mechanical performances of said material if they are not eliminated here.

There is therefore no chain extender present in this second embodiment.

The reaction of the two prepolymers can be total or partial.

According to a third possibility, said at least partially reactive thermoplastic prepolymer polymerized with the chain extender comprises:

a1) at least one reactive thermoplastic prepolymer as already defined herein above with this prepolymer bearing n identical reactive terminal functions X, chosen from: —NH2 (amine), —CO2H (carboxy) and —OH (hydroxyl), preferably —NH2 (amine) and —CO2H (carboxy) with n being 1 to 3, preferably from 1 to 2, more preferably 1 or 2, more particularly 2 a2) at least one chain extender Y-A'-Y, with A' being a hydrocarbon bisubstituent, bearing 2 identical terminal reactive functions Y, reactive by polyaddition (without elimination of the reaction byproduct), with at least one function X of said prepolymer a1), preferably having a molecular mass less than 500 and more preferably less than 400.

Advantageously, said at least one partially polymerized reactive thermoplastic prepolymer with the chain extender is constituted by a1) and a2) defined hereinabove.

Advantageously, Y is chosen from: oxazine, oxazoline, oxazolinone, oxazinone, imidazoline, epoxy, isocyanate, maleimide, cyclic anhydride, in particular oxazine, oxazoline, oxazolinone, oxazinone, imidazoline, maleimide, cyclic anhydride and preferably X1 is CO2H and Y1 is chosen from an epoxy and an oxazoline.

NH2 (amine) means primary and secondary amine.

Examples of suitable extenders a2) as a function of the X functions carried by said semi-crystalline polyamide prepolymer a1) include the following:

when X is NH2 or OH, preferably NH2:
either chain extender Y-A'-Y corresponds to Y is chosen from the groups: maleimide, isocyanate, optionally blocked, oxazinone and oxazolinone, cyclic anhydride, preferably oxazinone and oxazolinone, in particular maleimide, oxazinone and oxazolinone, cyclic anhydride, preferably oxazinone and oxazolinone and A' is a spacer or a carbonaceous substituent bearing the reactive functions or groups Y, chosen from:
a covalent bond between two functions (groups) Y in the case where Y=oxazinone and oxazolinone or
an aliphatic hydrocarbon chain or an aromatic and/or cycloaliphatic hydrocarbon chain, the latter two comprising at least one ring with 5 or 6 carbon atoms optionally substituted, with optionally said aliphatic hydrocarbon chain having optionally a molecular weight of 14 to 200 g.mol-1 or chain extender Y-A'-Y corresponds to Y being a caprolactam group and A' being able to be a carbonyl substituent such as carbonyl biscaprolactam or A' being able to be a terephthaloyl or an isophthaloyl,
or said chain extender Y-A'-Y carries a cyclic anhydride group Y and preferably this extender is chosen from a carboxylic cycloaliphatic and/or aromatic dianhydride and more preferably is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3', 4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfonetetracarbondic dianhydride, bicyclo[2.2.2]oct-7-ene-2,3,5,6-tetracarboxylic dianhydride, 1,2,3,4- cyclopentanetetracarboxylic dianhydride, 3,3',4,4'-diphenyl ether tetracarboxylic dianhydride or mixtures thereof and when X is COOH:

said chain extender Y-A'-Y corresponds to:

Y chosen from the groups: oxazoline, oxazine, imidazoline or aziridine, like 1,1'-iso- or tere-phthaloyl-bis (2-methyl aziridine) or epoxy, A' being a carbon spacer or substituent as defined above.

More particularly, when in said extender Y-A'-Y, said function Y is chosen from oxazinone, oxazolinone, oxazine, oxazoline or imidazoline, in particular oxazoline, in this case, in the chain extender represented by Y-A'-Y, A' may represent an alkylene such as —(CH2)m- where m ranges from 1 to 14 and preferably from 2 to 10 or A' may represent a cycloalkylene and/or a substituted (alkyle) or unsubstituted arylene, like benzene arylenes, such as o-, m-, -p phenylenes or naphthalene arylenes and preferably A' is an arylene and/or a cycloalkylene.

In the case of carbonyl- or terephthaloyl- or isophthaloyl-biscaprolactam as chain extender Y-A'-Y, the preferred conditions avoid the elimination of by-products, like the caprolactam during said polymerization and implementation when melted.

In the case where Y is an epoxy, the chain extender can be chosen from bisphenol A diglycidyl ether (BADGE) and its hydrogenated derivative (cycloaliphatic), bisphenol F diglycidyl ether, tetrabromobisphenol A diglycidyl ether or hydroquinone diglycidyl ethers, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with Mn<500, polypropylene glycol diglycidyl ether with Mn<500, polytetramethylene glycol diglycidyl ether with Mn<500, resorcinol diglycidyl ether, neopentylglycol diglycidyl ether, bisphenol A polyethylene glycol diglycidyl ether with Mn<500, bisphenol A polypropyleneglycol diglycidyl ether with Mn<500, dicarboxylic acid diglycidyl esters like the glycidyl ester of terephthalic acid or epoxidized diolefins (dienes) or fatty acids with double epoxidized ethylenic unsaturation, diglycidyl 1,2 cyclohexane dicarboxylate and mixtures thereof.

In the case of carbonyl- or terephthaloyl- or isophthaloyl-biscaprolactam as chain extender Y-A'-Y, the preferred conditions avoid the elimination of by-products, like the caprolactam during said polymerization and implementation when melted.

In the eventual case cited above where Y represents a blocked isocyanate function, this blocking can be achieved by blocking agents for the isocyanate function, like epsilon-caprolactam, methyl ethyl ketoxime, dimethyl pyrazole, di ethyl malonate.

Similarly, in the case where the extender is a dianhydride reacting with a prepolymer P(X')n where X=NH2, the preferred conditions avoid any imide ring formation during the polymerization and during molten implementation.

For X=OH or NH2, the group Y is preferably chosen from: isocyanate (not blocked), oxazinone and oxazolinone, more preferably oxazinone and oxazolinone, with A' as defined hereinabove as spacer or hydrocarbonaceous substituent.

Examples of chain extenders carrying oxazoline or oxazine reactive functions Y suitable for the implementation of the invention include those we can refer to those referenced "A", "B", "C" and "D" on page 7 of application EP 0,581,642, and to methods of preparation thereof and to the modes of reaction described there. "A" in this document is bisoxazoline, "B" bisoxazine, "C" 1,3 phenylene bisoxazoline and "D" 1,4-phenylene bisoxazoline.

As an example, in the case where X 32 CO2H and the chain extender Y-A'-Y is 1,4-phenylene bisoxazoline, the resulting reaction product has at least one recurring motif with the following structure:

—O—C(O)—P—C(O)—O—R1—NH—C(O)—A'—C (O)—NH—R1— wherein:

P is a polyamide with acid terminations HO-C—(O)—P—C(O)—OH obtained from amide motifs(A), (B) or (C), R1(CH2)2, and A' is a phenyl.

Examples of chain extenders with imidazoline reactive function Y suitable for implementation in the invention include those we can refer to described as ("A" to "F") on page 7 to 8 and Table 1 of page 10 in application EP 0,739,924 and to methods of preparation thereof and to the modes of reaction described there.

Examples of chain extenders with reactive function Y=oxazinone or oxazolinone which are suitable for the implementation of the invention include those we can refer to described as references "A" to "D" on page 7 to 8 of application EP 0,581,641, and to methods of preparation thereof and to the modes of reaction described there.

Examples of suitable oxazinone (6-embered ring) and oxazolinone (5-membered ring) Y groups include Y group derivatives of: benzoxazinone oxazinone or oxazolinone, with as spacer A' being able to be a single covalent bond with corresponding respective extenders being: bis-(benzoxazinone), bisoxazinone and bisoxazolinone.

A' may also be a C1 to C14 alkylene, preferably C2 to C10 but preferably A' is an arylene and more particularly it may be a phenylene (substituted by Y in the 1,2 or 1,3 or 1,4 positions) or a naphtalene substituent (disubstituted by Y) or a phthaloyl (iso- or terephthaloyl) or A' may be a cycloalkylene.

For Y functions like oxazine (6-membered ring), oxazoline (5-membered ring) and imidazoline (5-membered ring), the substituent A' may be as described above where A' can be a single covalent bond and with the corresponding respective extenders being: bisoxazine, bisoxazoline and bisimidazoline. A' may also be a C1 to C14 alkylene, preferably C2 to C10. Substituent A' is preferably an arylene and, more particularly, it may be a phenylene (substituted by Y in the 1,2 or 1,3 or 1,4 positions) or a naphthalene substituent (disubstituted by Y) or a phthaloyl (iso- or terephthaloyl) or A' may be a cycloalkylene.

In the case where Y=aziridine (nitrogen heterocycle with 3 atoms equivalent to ethylene oxide replacing the ether —O— with —NH—), the substituent A' may be a phthaloyl (1,1'iso- or tere-phthaloyl) with as example of extender of this type, 1,1' isophthaloyl-bis(2-methyl aziridine).

The presence of a catalyst for the reaction between said prepolymer P(X)n and said extender Y-A'-Y at a level ranging from 0.001 to 2%, preferably from 0.01 to 0.5% relative to the total weight of two co-reactants cited may accelerate the (poly)addition reaction and accordingly shorten the production cycle. Such a catalyst can be chosen from: 4,4' dimethyl aminopyridine, p-toluene sulfonic acid, phosphoric acid, NaOH and optionally those described for a polycondensation or transesterification as described in EP 0,425,341, page 9, lines 1 to 7.

Depending on a more particular case of choice of said extender, A' may represent an alkylene, such as —(CH2)m-where m ranging from 1 to 14 and preferably from 2 to 10 or represents an alkyl substituted or unsubstituted arylene, like benzene arylenes (like o-, m-, -p phenylenes) or naphthalene (with arylenes: naphthalenylenes). Preferably, A' represents an arylene that may be benzene or naphthalene substituted or unsubstituted.

As already stated, said chain extender (a2) preferably has a molecular weight less than 500, more preferably less than 400.

The proportion of said used extender varies from 1 to 20%, in particular from 5 to 20%, particularly from 10 to 20% by weight.

In cases of reactive compositions of the invention according to definition a), said reactive prepolymers are prepared by classic polycondensation reaction between the corresponding diamine and diacid components and optionally amino acids or lactams. Prepolymers carrying X' and Y' amine and carboxy functions on the same chain may be obtained for example by adding a combination of monomers (amino acid, diamine, diacid) having in total an equal quantity of amine and carboxy motifs. Another way of obtaining these prepolymers carrying one function X' and one Y' is, for example, by combining a prepolymer carrying 2 identical functions X'=amine, with a diacid prepolymer carrying Y': carboxy, with a global molar level of acid functions equal to that of the starting amine functions X'. To obtain prepolymers functionalized with identical functions (amines or carboxy) on the same chain, having an excess of diamine (or globally, amine functions) suffices for having terminal amine functions or an excess of diacid (or globally, carboxy functions) to have terminal carboxy functions.

In the case of a prepolymer P(X1)n with n identical X1 functions, the functionality 1 can be obtained in the presence of a monofunctional blocking component (monoacid or monoamine depending on the nature of X1=amine or carboxy).

Functionality n=2 can be obtained from difunctional components: diamines and diacids with an excess of one to bond X1 depending on this excess.

For n=3 for example, for a prepolymer P(X1)n, the presence of a trifunctional component is necessary, for example the presence of a triamine (one mole per chain of prepolymer) with a diamine in the reaction with a diacid. The preferred functionality for P(X1)n is n=2.

Optionally, the thermoplastic prepolymer or thermoplastic prepolymer mixture further comprises carbon-based fillers, in particular carbon black or carbon nanofillers, preferably selected from among carbon nanofillers, in particular graphenes and/or carbon nanotubes and/or carbon nanofibrils or mixtures thereof. These fillers serve to conduct electricity and heat, and consequently serve to make melting of the prepolymer matrix easier when it is heated.

Optionally, said thermoplastic prepolymer comprises at least one additive, notably selected from a catalyst, antioxidant, thermal stabilizer, UV stabilizer, light stabilizer, lubricant, filler, plasticizer, flame retardant, nucleating agent, colorant, electrical conductor, heat conductor or a mixture thereof.

Advantageously, said additive is selected from a flame retardant, electrical conductor and heat conductor.

Said flame retardants may be halogen-free flame retardants, such as those described in US 2008/0274355 and in particular a metal salt chosen from a metal salt of phosphinic acid, a metal salt of diphosphinic acid, a polymer containing at least one metal salt of phosphinic acid, a polymer containing at least one metal salt of diphosphinic acid or red phosphorus, an antimony oxide, a zinc oxide, an iron oxide, a magnesium oxide or metal borates such as a zinc borate or melamine pyrophosphates and melamine cyanurates. They may also be halogenated flame retardant agents such as a brominated or polybrominated polystyrene, a brominated polycarbonate or a brominated phenol.

According to another variant, the thermoplastic prepolymer or mixture of thermoplastic prepolymers can further comprise liquid crystal polymers or cyclized polybutylene terephthalate, or mixtures containing said liquid crystal polymers or cyclized polybutylene terephthalate as additives, such as the CBT100 resin marketed by the company CYCLICS CORPORATION. With these compounds, the prepolymer matrix can be fluidified in the molten state, for better penetration to the core of the fiber rovings. Depending on the nature of the thermoplastic prepolymer, or prepolymer mixture, used to implement the impregnation matrix, notably the melting point thereof, one or another of these compounds will be chosen.

The thermoplastic prepolymers going into the makeup of the impregnation matrix of the fibrous material are polymer precursors and can be selected from:

the family of aliphatic or cycloaliphatic polyamides (PA) or semi-aromatic PA (also called polyphthalamides (PPA));

polyureas, in particular aromatic polyureas;

the acrylic family like polyacrylates and more specifically polymethylmethacrylate (PMMA) or derivatives thereof;

the family of polyarylether ketones (PAEK) such as polyether ether ketone (PEEK), or polyaryl ether ketone ketones (PAEKK) such as polyether ketone ketone (PEKK) or derivatives thereof, aromatic polyetherimides (PEI);

polyarylsulfides, in particular polyphenylenesulfides (PPS);

polyarylsulfones, in particular polyphenylenesulfones (PPSU);

polyolefins, in particular polypropylene (PP);

polylactic acid (PLA);

polyvinyl alcohol (PVA);

fluorinated prepolymers, in particular poly(vinylidene fluoride) (PVDF), or polytetrafluoroethylene (PTFE) or polychlorotrifluoroethylene (PCTFE); and mixtures thereof.

The prepolymer can be in homopolyamide or copolyamide form.

Advantageously, when said prepolymer is a mixture of two prepolymers, P1 and P2, the proportion by weight of prepolymer P1 and P2 is included between 1-99% to 99-1%.

Advantageously, when said thermoplastic prepolymer is in mixture and used in a tank, it is added to the tank in powder form obtained beforehand by "dry blend" or "compound" or directly in the tank in "dry blend" form.

Advantageously, it is added in powder form obtained beforehand by dry blend or directly in the tank in dry blend form and the mixture of two prepolymers P1 and P2 is a mixture of PEKK and PEI.

Advantageously, the PEKK/PEI mixture is included from 90-10% to 60-40% by weight, in particular from 90-10% to 70-30% by weight.

The number-average molecular weight, Mn, of said final nonreactive thermoplastic polymer is greater than 10,000, preferentially in a range extending from 10,000 to 40,000, preferably in a range extending from 10,000 to 40,000, preferably from 12,000 to 30,000. These Mn values may correspond to inherent viscosities greater than or equal to 0.8, as determined in m-cresol according to the ISO 307: 2007 standard but by changing the solvent (use of m-cresol instead of sulfuric acid and the temperature being 20° C.).

The Mn are in particular determined by the calculation of the level of terminal functions determined by potentiometric titration in solution.

The masses Mn can also be determined by steric exclusion chromatography or by NMR.

The nomenclature used to define the polyamides is described in the ISO 1874-1:2011 standard "Plastics-Polyamide (PA) Moulding And Extrusion Materials-Part 1: Designation", in particular on page 3 (Tables 1 and 2) and is well known to the person skilled in the art.

The polyamide can be a homopolyamide or copolyamide or a mixture thereof.

Advantageously, the prepolymers making up the matrix are selected from polyamides (PA), in particular selected from aliphatic polyamides, cycloaliphatic polyamides, and semi-aromatic polyamides (polyphthalamides) optionally modified by urea groups, and copolymers thereof, polymethylmethacrylate (PPMA) and copolymers thereof, polyether imides (PEI), and poly(phenylene sulfide) (PPS), poly(phenylene sulfone) (PPSU), polyetherketoneketone (PEKK), polyetheretherketone (PEEK), and fluorinated polymers like poly(vinylidene fluoride) (PVDF).

For the fluorinated polymers, a vinylidene fluoride homopolymer (VDF with formula $CH_2=CF_2$) or VDF copolymer comprising at least 50% by mass of VDF and at least one other monomer copolymerizable with VDF can be used. The VDF level must be over 80% by mass, even better 90% by mass, to provide good mechanical strength to the structural part, especially when it is subject to thermal and chemical stresses. The comonomer can be a fluoride monomer such as for example vinyl fluoride.

For structural parts that need to resist high temperatures, besides fluorinated polymers, advantageously according to the invention the following can be used: PAEK, (PolyArylEtherKetone), such as poly(etherketones) PEK, poly(etheretherketone) PEKK, poly(etherketoneketone) PEKK, poly(etherketoneether ketoneketone) PEKEKK or PA having high glass transition temperature Tg).

Advantageously, said at least one thermoplastic prepolymer is selected from polyamides, PEKK, PEI and a mixture of PEKK and PEI.

Advantageously, said polyamide is selected from aliphatic polyamides, cycloaliphatic polyamides and semi-aromatic polyamides (polyphthalamides).

Advantageously, said aliphatic polyamide prepolymer is selected from:

polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, and polyamide 12/1010, or a mixture thereof or a copolyamide thereof, and block copolymers, notably polyamide/polyether (PEBA) and said semi-aromatic polyamide is a semi-aromatic polyamide optionally modified with urea units, notably PA MXD6 and PA MXD10, or a semi-aromatic polyamide of formula X/YAr, such as described in EP 1,505,099, notably a semi-aromatic polyamide of formula A/XT in which A is selected from a unit obtained from an amino acid, a unit obtained from a lactam and a unit corresponding to the formula (Ca diamine).(Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from aliphatic diamines, linear or branched, cycloaliphatic diamines and alkylaromatic diamines and the unit (Cb diacid) being chosen from aliphatic, linear or branched diacids, cycloaliphatic diacids and aromatic diacids.

X.T denotes the unit obtained by polycondensation of the Cx diamine and terephthalic acid, where x represents the number of carbon atoms of the Cx diamine, where x is included between 6 and 36, advantageously between 9 and 18, notably a polyamide with formula A/6T, A/9T, A/10T or A/11T, where A is as defined above, in particular a PA 6/6T, PA 66/6T, PA 6I/6T, PA MPMDT/6T, PA PA11/10T, PA 11/6T/10T, PA MXDT/10T, PA MPMDT/10T, PA BACT/10T, PA BACT/6T, PA BACT/10T/6T polyamide.

T corresponds to terephthalic acid, MXD corresponds to m-xylylene diamine, MPMD corresponds to methylpentamethylene diamine and BAC corresponds to bis(aminomethyl)cyclohexane.

Advantageously, the partially polymerized reactive prepolymer, optionally with a chain extender, has a glass transition temperature Tg greater than or equal to 80° C., preferably greater than or equal to 100° C., in particular greater than or equal to 120° C., in particular greater than or equal to 140° C., or is a semi-crystalline prepolymer whose melting temperature Tf is greater than or equal to 150° C.

Fibrous Materials

Concerning the fibers making up said fibrous material, they are notably fibers of mineral, organic or plant origin in the form of rovings.

Carbon fibers, fiberglasses, basalt fibers, silica fibers or silicon carbide fibers for example can be listed among the fibers of mineral origin.

Advantageously, these are carbon fibers for which the number of fibers per roving is greater than or equal to 30 K, in particular is greater than or equal to 50 K, or fiberglass rovings whose grammage is greater than or equal to 1200 Tex, in particular greater than or equal to 2400 Tex, in notably greater than or equal to 2400 Tex Thermoplastic or thermosetting polymer-based fibers, such as semi-aromatic polyamide fibers, aramid fibers or polyolefin fibers for example, can be listed among fibers of organic origin. Preferably, they are amorphous thermoplastic polymer-based and have a glass transition temperature Tg greater than the Tg of the thermoplastic prepolymer or prepolymer mixture making up the impregnation matrix when the matrix is amorphous or greater than Tm of the thermoplastic prepolymer or prepolymer mixture making up the impregnation matrix when the matrix is semicrystalline. Advantageously, they are semicrystalline thermoplastic polymer-based and have a melting point Tm greater than the Tg of the thermoplastic prepolymer or prepolymer mixture making up the impregnation matrix when the matrix is amorphous or greater than Tm of the thermoplastic prepolymer or prepolymer mixture making up the impregnation matrix when the matrix is semicrystalline. That way, there is no risk of melting of the organic fibers making up the fibrous material during impregnation by the thermoplastic matrix of the final composite. Natural fibers based on linen, hemp, lignin, bamboo, silk notably spider silk, sisal and other cellulose fibers, in particular viscose can be listed among fibers of plant origin. These fibers of plant origin can be used pure, treated or else coated with a coating layer, in order to indeed prove adhesion and impregnation of the thermoplastic prepolymer matrix.

The fibrous material can also be a fabric, braided or woven with fibers.

It can also correspond to fibers with holding yarns.

These constituent fibers can be used alone or in mixtures. Thus, organic fibers can be mixed with mineral fibers in order to be impregnated with thermoplastic prepolymer, optionally with a chain extender, and to form the impregnated fibrous material.

The rovings of organic fibers can have several linear densities. They can further have several geometries. The fibers can come in short fiber form, which then make up felts or nonwovens which can come in the form of strips, layers or pieces, or in continuous fiber form, which make up 2D fabrics, braids or rovings of unidirectional (UD) or nonwoven fibers. The fibers making up the fibrous material can further come in the form of a mixture of these reinforcing fibers of varied geometry. Preferably the fibers are continuous.

Preferably the fibrous material is made up of continuous carbon, glass or silicon carbide fibers or mixtures thereof, in particular carbon fibers. It is used in the form of a roving or several rovings. The thermoplastic prepolymer for impregnation must be distributed within the fibers the most homogeneously possible in order to get a minimum of porosities, meaning a minimum of voids between the fibers. In fact, the presence of porosities in this type of material can act as stress concentration points, when placed under mechanical stress by traction for example, which then form failure initiation points for the impregnated fibrous material and make it mechanically fragile. A homogeneous distribution of the prepolymer or prepolymer mixture therefore improves the mechanical strength and homogeneity of the composite material formed from these impregnated fibrous materials.

Thus, the fiber level in said impregnated fibrous material is included between 45 to 65% by volume, preferably from 50 to 60% by volume, in particular from 54 to 60% by volume. The impregnation level can be measured by image analysis (notably using a microscope or camera or digital camera), from a transverse section of the ribbon, by dividing the surface area of the ribbon impregnated by the polymer by the total surface area of the product (impregnated surface area plus surface area of the porosities). In order to get a good quality image, it is preferable to coat the ribbon cut in the transverse direction thereof with a standard polishing resin and to polish with a standard protocol allowing the observation of the sample under at least 6 times microscopic enlargement. Advantageously, the porosity level of said impregnated fibrous material is less than 10%, notably less than 5% and in particular less than 2%.

It must be noted that a null porosity level is difficult to reach and that consequently, advantageously the porosity level is greater than 0% but less than the levels given above.

The porosity level corresponds to the closed porosity level and can be determined either by electron microscope, or as being the relative difference between the theoretical density and the experimental density of said impregnated fibrous material as described in the examples part of the present invention.

Method for Preparation of the Fibrous Material

The fibrous material impregnated with a partially polymerized thermoplastic prepolymer, optionally with a chain extender, can be prepared in two steps:

A first step of preimpregnation by a thermoplastic prepolymer and optionally a chain extender and a second step of heating by means of at least one supporting part (E) and at least one heating system, said supporting part being located level with the heating system.

First Step: Preimpregnation

The first step of preimpregnation to produce a material can be done according to techniques well known to the person skilled in the art and in particular selected from those described above. Thus they can be done by a preimpregnation technology by powder deposition, by molten route, in particular by pultrusion, by cross-head extrusion of molten prepolymer, by continuous passage of the fibers in an aqueous prepolymer powder dispersion or aqueous prepolymer particle dispersion or aqueous prepolymer emulsion or suspension, by fluidized bed, equipped or not with at least one supporting part (E'), by spraying by nozzle or spray gun by dry route in a tank equipped or not equipped with at least one supporting part (E').

However, the preimpregnation step depends on the nature of the reactive prepolymer used.

Thus, in the case of a reactive prepolymer carrying, on the same chain, two terminal functions X' and Y', functions that are respectively co-reactive with one another by condensation, the use of the molten route requires the use of an extruder, which may cause the polymerization of the prepolymer in this extruder, to lead to the nonreactive final thermoplastic polymer upon leaving the extruder, which would greatly harm the impregnation quality of the fibers; in some cases, this could even block the screw of the extruder.

As a result, it is necessary to use an aqueous dispersion of prepolymer particles or an emulsion or an aqueous suspension of prepolymer, a fluidized bed or spraying by a nozzle or gun by dry route in a tank.

The supporter can be a concave, convex or cylindrical compression roller, in particular it is cylindrical. FIG. 1 shows an example of a tank provided with a supporter and FIG. 2 shows an example of a tank comprising a fluidized bed in which the supporter is a cylindrical compression roller.

The same tank can be used without a fluidized bed present and equipped with a spray gun.

In the case of at least two polyamide prepolymers that are reactive with one another and each respectively carry two identical terminal functions X' or Y', or at least one thermoplastic polyamide prepolymer, carrying n reactive terminal functions X with a chain extender, the impregnation by molten route can only be done by the separate introduction of different species that are reactive with one another, in a mixer, just before the impregnation of the fibers or directly in the impregnation chamber. Preferably, the preimpregnation step is done using an aqueous dispersion of prepolymer particles or an emulsion or aqueous suspension of prepolymer, a fluidized bed or spraying by a nozzle or spray gun by dry route in a tank, in particular using a fluidized bed.

Advantageously, the preimpregnation is done with a system as defined above and one or several supporting part(s) (E") is(are) present upstream from said system.

It must be noted that the supporting parts (E) and (E") can be identical or different whether regarding the material or the shape and properties thereof (diameter, length, width, height, etc. according to the shape).

Molten Route

The preimpregnation step can be done by molten route, in particular by pultrusion.

Molten route preimpregnation techniques are well known to the person skilled in the art and are described in the above references.

The preimpregnation step is done by passage of said roving or rovings in a bath comprising the prepolymer matrix and then passage in a heated die where the bath is provided with fixed or rotating supporters on which the roving travels thus causing a spreading of said roving allowing a preimpregnation of said roving.

The preimpregnation can in particular be done such as described in US 2014/0005331A1 with a supply as described in this application or the resin is supplied from both sides of said roving and there is no contact surface eliminating a part of the resin from both surfaces.

Advantageously, the preimpregnation step is done by molten route at high-speed, meaning with the feed speed of said roving or said rovings greater than or equal to 5 m/min, in particular greater than 9 m/min.

Fluidized Bed

The preimpregnation step can be done in fluidized bed.

International application WO 2015/121583 describes an exemplary unit for implementation of a production method without the heating step by means of at least one supporting part.

The system describes the use of a tank comprising a fluidized bed to carry out the preimpregnation step and can be used in the context of the invention.

Advantageously, the tank comprising the fluidized bed is provided with at least one supporting part (E') (FIG. 1) which can be a compression roller (FIG. 2).

Supporting part (E') must be understood to mean any system on which the roving has the possibility of traveling in the tank. The supporting part (E') can have any shape so long as the roving can travel in contact with it.

An exemplary supporting part (E') is detailed in FIG. 1, without restricting the invention thereto. It must be noted that the supporting parts (E) and (E') can be identical or different whether regarding the material or the shape and properties thereof (diameter, length, width, height, etc. according to the shape).

However, the supporting part (E') is neither heating nor heated.

The step of preimpregnating the fibrous material is done by passing one or more rovings in a continuous preimpregnation device comprising a tank (10) provided with at least one supporting part (E') and comprising a fluidized bed (12) of powder of said at least one prepolymer and optionally a chain extender.

The powder of said at least one prepolymer an optionally a chain extender is suspended in a gas G (for example, air) added to the tank and circulating in the tank (10) through a hopper (11). The roving(s) circulate through this fluidized bed (12).

The tank can have any shape, in particular cylindrical or parallelepipedic, in particular a rectangular parallelepiped or a cube, advantageously a rectangular parallelepiped.

The tank (10) can be an open or closed tank.

In the case where the tank is closed, it is then equipped with a sealing system so that the powder of said at least one prepolymer and optionally a chain extender cannot exit said tank.

This preimpregnation step is therefore done by dry route, meaning that said at least one prepolymer and optionally a chain extender is in powder form, notably suspended in a gas, in particular air, but cannot be dispersed in a solvent or water.

Each roving to be preimpregnated is unwound from a feed-reel device under traction generated by cylinders (not shown).

Each feed reel is provided with a brake (not shown) so as to apply a tension to each fiber roving. In this case, an alignment module serves to arrange the fiber rovings parallel to each other. In this way, the fiber rovings need not be in contact with each other, so that a mechanical breakdown of the fibers by friction with each other can be avoided.

The fiber roving or the parallel fiber rovings then pass into a tank (10) comprising in particular a fluidized bed (12) provided with a supporting part (E') which is a compression roller (24) in the case from FIG. 2. The fiber roving or parallel fiber rovings then leave the tank after preimpregnation after possible control of the residence time in the powder.

The expression "residence time in the powder" means the time during which the roving is in contact with said powder in the fluidized bed.

If the fibrous material, such as the glass fiber, has a sizing, an optional step of de-sizing can be done before the fibrous material passes into the tank.

The term "sizing" designates the surface treatments applied to the reinforcing fibers upon leaving the nozzle (textile sizing) and on the fabrics (plastic sizing).

Advantageously, the tank used in the inventive method comprises a fluidized bed and said preimpregnation step is done with a simultaneous spreading of said roving or rovings between the entry to and exit from the tank comprising said fluidized bed.

The expression "entry to the tank of said fluidized bed" corresponds to the vertical tangent to the edge of the tank which comprises the fluidized bed.

The expression "exit from the tank of said fluidized bed" corresponds to the vertical tangent to the other edge of the tank which comprises the fluidized bed.

Depending on the geometry of the tank, the distance between the entry and the exit thereof therefore corresponds to the diameter in the case of a cylindrical tank, the side in the case of a cubic tank or the width or length in the case of a rectangular parallelepiped tank. The spreading consists of isolating each fiber making up said roving as much as possible from the other fibers which surround it in the space closest thereto. It corresponds to the transverse separation of the roving.

In other words, the transverse separation or the width of the roving increases between the entry of the fluidized bed (or to the tank comprising the fluidized bed) and the exit from the fluidized bed (or from the tank comprising the fluidized bed) and thus makes an improved preimpregnation of the fibrous material possible.

The use of at least one supporter (E'), in particular a cylindrical compression roller, in the preimpregnation step, therefore makes an improved preimpregnation possible compared to the methods from the prior art.

The expression "compression roller" means that the traveling roving rests partially or completely on the surface of said compression roller, which leads to the spreading of said roving.

Advantageously, said at least one compression roller has a cylindrical shape and the percentage of spreading of said roving or said rovings between the entry to and exit from the tank for said fluidized bed is included between 1% and 1,000%, preferably between 100% and 800%, preferably between 200% and 800%, and preferably between 400% and 800%.

The percentage spreading is equal to the ratio of the final width of the roving to the initial width of the roving multiplied by 100.

The diameter of said at least one compression roller is included from 3 mm to 500 mm, preferably from 10 mm to 100 mm and in particular from 20 mm to 60 mm.

Under 3 mm, the deformation of the fiber induced by the compression roller is too great.

Advantageously, the compression roller is cylindrical and not grooved, and in particular it is metal. When the supporting part (E') is at least one compression roller, according to a first variant, a single compression roller is present in the fluidized bed and said preimpregnation is done near the angle $\alpha_1$ formed by said roving or said rovings between the entry to said compression roller and the vertical tangent to said compression roller.

The angle $\alpha_1$ formed by said roving or rovings between the entry to said compression roller and the vertical tangent to said compression roller allows the formation of an area in which the powder is going to concentrate thus leading to the "corner effect" which with the simultaneous spreading of the roving by said compression roller allows a preimpregnation over a greater width of the roving and therefore an improved preimpregnation compared to the techniques of the improved prior art.

Advantageously, the angle $\alpha_1$ is included from 0 to 89°, preferably 5° to 85°, preferably 5° to 45° and preferably 5° to 30°.

However, an angle $\alpha_1$ included from 0 to 5° is likely to give rise to risks of mechanical stress, which will lead to breakage of fibers and an angle $\alpha_1$ included from 85° to 89° does not create sufficient mechanical force for creating "the corner effect."

A value of the angle $\alpha_1$ equal to 0° therefore corresponds to a vertical fiber. It is obvious that the height of the cylindrical compression roller is adjustable thus making it possible to position the fiber vertically.

Advantageously, the entry edge of the tank (23a) is equipped with a roller, in particular a cylindrical and rotary roller, on which said roving or rovings travel thus leading to a prior spreading. It is obvious that "the corner effect" caused by the angle $\alpha_1$ enhances the preimpregnation on one surface but the spreading of said roving obtained with the compression roller also makes it possible to have a preimpregnation on the other surface of said roving. In other words, said preimpregnation is enhanced on one surface of said roving or rovings near the angle $\alpha_1$ formed by said roving or rovings between the entry to said at least one compression roller $R_1$ and the vertical tangent to the compression roller $R_1$ but the spreading also makes preimpregnation of the other surface possible.

The angle $\alpha_1$ is as defined above.

Advantageously, the entry edge of the tank (23a) is equipped with a roller, in particular a cylindrical and rotary roller, on which said roving or rovings travel thus leading to a spreading prior to the preimpregnation.

In one embodiment, the spreading is initiated at the entry edge of the tank (23a) and continues at the supporter(s) (E') defined hereinabove.

In another embodiment, one or several supporter(s) (E") are present upstream from the tank comprising the fluidized bed at which the spreading is initiated.

The supporter(s) (E") are as defined for (E').

Advantageously, the spreading is initiated at said supporter(s) (E") defined hereinabove and optionally continues at the entry edge of the tank of the tank, then at said supporter(s) (E') defined hereinabove.

The spreading is then maximal after passage at the compression roller(s) (E').

Advantageously, the percentage of spreading of said roving or said rovings between the entry to the supporting parts (E") and the exit from the tank of said fluidized bed is included between 1% and 1,000%, preferably between 100% and 800%, preferably between 200% and 800%, and preferably between 400% and 800%.

According to other variants, two, three or more rollers can be present in the fluidized bed.

Advantageously, the diameter by volume D90 of the thermoplastic polymer powder particles is included from 30 to 500 µm, advantageously from 80 to 300 µm.

Advantageously, the diameter by volume D10 of the thermoplastic polymer powder particles is included from 5 to 200 µm, advantageously from 15 to 100 µm.

Advantageously, the diameter by volume of the particles of thermoplastic polymer powder is included in the D90/D10 ratio, or included from 1.5 to 50, advantageously from 2 to 10.

Advantageously, the diameter by volume D50 of the thermoplastic polymer powder particles is included from 10 to 300 µm, notably from 30 to 200 µm and more specifically from 45 to 200 µm.

Spraying by Spray Gun

The step of preimpregnation of the fibrous material can also be done by sending one or more rovings into a device for continuous preimpregnation by spraying that comprises a tank comprising one or more nozzle(s) or one or more gun(s) spraying the reactive prepolymer powder, optionally with a chain extender, on the fibrous material at the roller entry.

The reactive prepolymer powder(s), optionally with a chain extender, is sprayed on said fibrous material in the tank by means of nozzle(s) or spray gun(s) near the supporting part notably of the compression roller (on entry). The roving(s) circulate through this tank.

An example with a spray gun is shown in FIG. 3, without being limited thereto.

All the characteristics of the supporting parts, and in particular the compression rollers, and the angle $\alpha_1$ causing the corner effect and detailed for the fluidized bed are also valid for spraying by spray gun. According to other variants, two, three or more rollers can be present each having a spray gun.

Second Step: Heating

The step of preimpregnation can therefore be done by any means provided or not with at least one supporter (E').

The presence of the supporter allows the spreading of the roving and improves the preimpregnation. However, the presence of this supporting part is not indispensable as long as a heating system provided with at least one supporting part (E) is present after the preimpregnation step.

The expression "supporting part (E)" means any system over which the roving has the possibility of traveling. The supporting part (E) can have any shape so long as the roving can travel over it. It can be fixed or rotating.

The heating system is any system releasing heat or emitting radiation which could heat the supporting part (E) and the roving preimpregnated with resin.

It can be an infrared heater, UV lamp or convection heater.

The supporting part (E) is consequently conducting or absorbs the radiation emitted by the heat. The expression "heat-conducting supporting part (C)" means that the supporting part (E) is made up of material capable of absorbing and conducting heat.

It can also be a microwave or laser heating system.

In this case, the supporting part does not conduct heat or does not absorb the radiation emitted by the heat.

The expression "non-heat-conducting supporting part (C)" means that the supporting part (E) is made up of material incapable of absorbing and conducting heat.

Said at least one supporting part (E) is located or included in the environment of the heating system, meaning that it is not outside the heating system.

Advantageously, said heating system is mounted over said at least one supporting part (E). The heating system is at a sufficient height for said at least one prepolymer, and optionally the chain extender present on the roving, to be able to melt, but without damaging said prepolymer and optionally the chain extender.

However, said heating system comprises either solely said at least one supporting part (E) but may also comprise a portion of the roving outside of said supporting system (E), where said portion of roving is located before and/or after said supporting system (E).

A representation of the heating system and three supporters (E), corresponding to $R'_1$, $R'_2$ and $R'_3$ is shown in FIG. 4, without being limited in any way thereto.

It is obvious that a second heating system can be present under the supporters, thus allowing a uniform melting of said prepolymer on both surfaces of the roving.

The height between the heating system and the supporters is from 1 to 100 cm, preferably from 2 to 30 cm, in particular from 2 to 10 cm.

The heating system shown in FIG. 4 is a horizontal system. However, the heating system(s) can be arranged vertically with travel of the roving through the supporters also vertical. It must be noted that the travel speed of the roving at the heating system is sufficient for said prepolymer, and optionally the chain extender, to be able to melt and optionally partially polymerize, but without causing the complete polymerization of the prepolymers or of the prepolymer with chain extender.

Consequently, this heating step serves to complete the impregnation of the roving done previously during the preimpregnation step and notably to get an impregnation that is homogeneous and to the core without causing the completely polymerization that would lead to the final thermoplastic polymer. Effectively, whatever the system used for the preimpregnation step, a first spreading occurs during that step, in particular if the preimpregnation step is done with the use of supporting parts (E'), such as in a fluidized bed with at least one supporter as described above.

A first spreading of the roving occurs near said compression rollers corresponding to the supporting parts (E') with a "corner effect" because of the partial or full travel of said roving over said supporter(s) (E') and the second spreading occurs during the heating step near said compression rollers corresponding to the supporting parts (E) because of the partial or full travel of said roving over said supporter(s) (E).

The second spreading is preceded during the passage of the roving in the heating system, before partial or full travel thereof over said supporter(s) (E), by the shrinkage of the roving because of the melting of the polymer on said roving.

This second spreading combined with melting of said polymer matrix by the heating system and the shrinkage of the roving serves to homogenize the preimpregnation and thus finalize the impregnation, and to thus have an impregnation to the core and have a high fiber level by volume, in particular constant in at least 70% of the volume of the strip or ribbon, in particular in at least 80% of the volume of the strip or ribbon, in particular in at least 90% of the volume of the strip or ribbon, more specifically in at least 95% of the volume of the strip or ribbon, and also to reduce the porosity. The spreading is a function of the fibrous material used. For example, the spreading of a carbon fiber material is much greater than that of a linen fiber material.

The spreading is also a function of the number of fibers in the roving, their average diameter and their cohesion due to the sizing.

Advantageously, the spreading percentage during the heating step between the entry to the first compression roller $R'_1$ and the exit from the third compression roller $R'_3$ is about 20 to 150%, in particular from 50 to 75%.

After the passage of the strip through the first heating system, the strip shrinks.

The various spreadings during the heating step combined with the melting of the thermoplastic polymer and the shrinkage of the roving during said heating step make it possible to produce an impregnated fiber level after the heating step included from 45% to 64% by volume, preferably from 50% to 60% by volume, in particular from 54 to 60% by volume (fiber level which cannot be reached by conventional techniques by molten route), where the fiber level by volume and the distribution of fibers is substantially identical on average on either side of the median plane of the fibrous material over the full length of said fibrous material thus in particular leading to obtaining a notably single-layer fibrous material.

Below 45% fibers, the reinforcement is not of interest as it relates to the mechanical properties. Above 65%, the limits of the method are reached and the mechanical properties are lost again.

Advantageously, the porosity level of said impregnated fibrous material is less than 10%, notably less than 5% and in particular less than 2%.

This therefore makes it possible to work with high travel speeds and thus reduce the production costs.

Shaping Step

Optionally a step is done of shaping the roving or said parallel rovings of said impregnated fibrous material.

A calendaring system such as described in WO 2015/121583 can be used.

In the same manner as above, the travel speed of the roving at the calendar is sufficient for said prepolymer, and optionally the chain extender, to be able to be shaped and optionally partially polymerize, but without causing the complete polymerization of the prepolymers or of the prepolymer with chain extender.

According to another aspect, the present invention relates to the use of an impregnated fibrous material, as defined hereinabove, for preparing an impregnated fibrous material comprising a fibrous material with continuous fibers and at least one nonreactive thermoplastic polymer, the number-average molecular weight Mn of which is greater than 10,000, preferably in a range extending from 10,000 to 40,000, preferably from 12,000 to 30,000.

Advantageously, and the molten viscosity is greater than 100 Pa.s, in particular greater than 200 Pa.s, preferably>400 Pa.s and more preferably>600 Pa.s.

Advantageously, the preparation of said impregnated fibrous material comprising a fibrous material with continuous fibers and at least one nonreactive thermoplastic polymer is done by heating allowing the polymerization of said reactive thermoplastic prepolymer.

According to another aspect, the present invention relates to the use of an impregnated fibrous material, such as defined above, for the preparation of calibrated ribbons suitable for the manufacture of three-dimensional composite parts by automatic application of said ribbons by means of a robot.

According to another aspect, the present invention relates to a ribbon comprising at least one fibrous material as defined above.

Advantageously, said ribbon is a unidirectional single ribbon or a plurality of unidirectional parallel ribbons.

Advantageously said ribbon has a width (I) and thickness (ep) suitable for robot application in the manufacture of three-dimensional parts, without the need for slitting, and preferably a width (I) of at least 5 mm and up to 400 mm, preferably between 5 and 50 mm, and even more preferably between 5 and 20 mm.

Advantageously, the thermoplastic prepolymer of said tape is a polyamide notably selected from an aliphatic polyamide such as PA 6, PA 11, PA 12, PA 66, PA 46, PA 610, PA 612, PA 1010, PA 1012, PA 11/1010 or PA 12/1010 or a semi-aromatic polyamide such as PA MXD6 and PA MXD10 or selected from PA 6/6T, PA 61/6T, PA 66/6T, PA 11/10T, PA 11/6T/10T, PA MXDT/10T, PA MPM DT/10T, PA BACT/6T, PA BACT/10T and PA BACT/10T/6T, PEEK, PEKK and PEI or a mixture thereof.

Advantageously, it is selected from notably an aliphatic polyamide such as PA 6, PA 11, PA 12, PA 11/1010 or PA 12/1010 or a semi-aromatic polyamide such as PA MXD6 and PA MXD10 or selected from PA 6/6T, PA 61/6T, PA 66/6T, PA 11/10T, PA 11/6T/10T, PA MXDT/10T, PA MPMDT/10T and PA BACT/10T, PA BACT/6T, PA BACT/10T/6T.

According to another aspect, the present invention relates to the use of a ribbon such as defined above in the production of three-dimensional composite parts.

Said fibrous material impregnated with a prepolymer as defined hereinabove can be used for thermo-stamping, for example, by preforming flat by robot deposition of ribbon impregnated with a prepolymer, then preheating of said impregnated ribbon to increase the molten viscosity and therefore increase the number-average molecular weight, and next to transfer the ribbon impregnated with final nonreactive thermoplastic polymer into a mold allowing a cycle time of about 1 mn and a much lower energy cost.

Advantageously, said production of said composite parts relates to the fields of transportation, in particular automobile, petroleum and gas, in particular offshore, gas storage, aeronautics, nautical and rail; renewable energies, in particular wind, tidal, energy storage devices, solar panels; thermal protection panels; sports and recreation, health and medical, and electronics.

According to another aspect, the present invention relates to a three-dimensional composite part, wherein it results from the use of at least one unidirectional ribbon of impregnated fibrous material as defined above.

Advantageous Embodiments of the Method From the Invention

Advantageously, the fibrous material is chosen from carbon fiber and fiberglass rovings.

Advantageously, the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material comprises carbon fiber rovings and the thermoplastic prepolymer used for impregnating the carbon fiber is selected from a polyamide, in particular an aliphatic polyamide such as PA 11, PA 12, PA a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material is made up of carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material comprises glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material is made up of glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof.

Advantageously, the fibrous material comprises carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥80° C. or the Tf is≥150° C.

Advantageously, the fibrous material is made up of carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥80° C. or the Tf is≥150° C.

Advantageously, the fibrous material comprises carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥100° C. or the Tf is≥150° C.

Advantageously, the fibrous material is made up of carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥100° C. or the Tf is≥150° C.

Advantageously, the fibrous material comprises carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥120° C. or the Tf is≥150° C.

Advantageously, the fibrous material is made up of carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥120° C. or the Tf is≥150° C.

Advantageously, the fibrous material comprises carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer≥140° C. or the Tf is≥150° C.

Advantageously, the fibrous material is made up of carbon fiber rovings and the thermoplastic prepolymer used for impregnating the carbon fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer≥140° C. or the Tf is≥150° C.

Advantageously, the fibrous material comprises glass fiber rovings and the thermoplastic prepolymer used for impregnating the glass fiber is selected from a polyamide, in particular an aliphatic polyamide such as PA 11, PA 12, a PA 11/1010, a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥80° C. or the Tf is≥150° C.

Advantageously, the fibrous material is made up of glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥80° C. or the Tf is≥150° C.

Advantageously, the fibrous material comprises glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥100° C. or the Tf is≥150° C.

Advantageously, the fibrous material is made up of glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥100° C. or the Tf is≥150° C.

Advantageously, the fibrous material comprises glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥120° C. or the Tf is≥150° C.

Advantageously, the fibrous material is made up of glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥120° C. or the Tf is≥150° C.

Advantageously, the fibrous material comprises glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, a PA MPMDT/10T, a PA BACT/10T, a PA BACT/6T, a PA BACT/10T/6T, a PA MXD6 and a PA MXD10, a PEKK and a PEI or a mixture thereof and the Tg of said thermoplastic polymer is≥140° C. or the Tf is≥150° C.

Advantageously, the fibrous material is made up of glass fiber rovings and the thermoplastic prepolymer used for impregnating the glass fiber is selected from a polyamide, in particular an aliphatic polyamide such as PA 11, PA 12, a PA 11/1010 and a PA 12/1010, a semi-aromatic polyamide, in particular PA 11/10T, a PA 11/6T/10T, a PA MXDT/10T, or PA MPMDT/10T, or PA BACT/10T, PA BACT/6T, PA BACT/10T/6T, a PEKK and a PEI or a mixture thereof and the Tg of said thermoplastic polymer is≥140° C. or the Tf is≥150° C.

Advantageously, the fibrous material comprises fiberglass or carbon fiber rovings as defined hereinabove and the thermoplastic prepolymer used to impregnate the fiber is chosen from an aliphatic polyamide such as PA 11, PA 12, a PA 11/1010 and a PA 12/1010, a semi-aromatic polyamide, in particular a PA 11/10T, a PA 11/6T/10T, a PA MXDT/10T, a PA MPMDT/10T, or PA BACT/10T, PA BACT/6T, PA BACT/10T/6T and the Tg and the Tf of said thermoplastic prepolymer are as defined hereinabove.

The arrows near the fiber indicate the direction of travel of the fiber.

Figure 3:
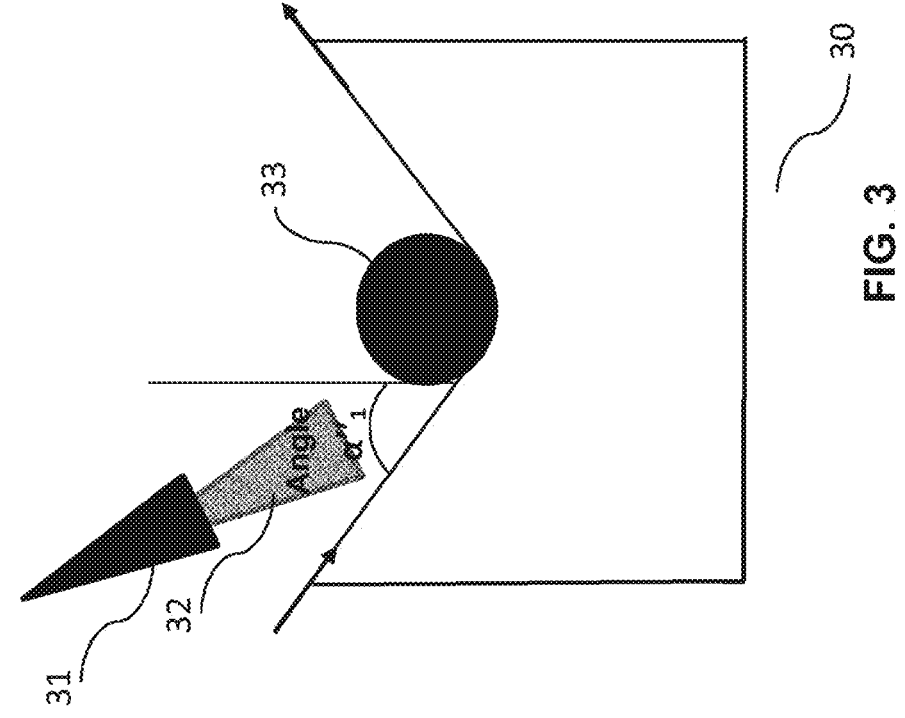

FIG. 3 presents describes an embodiment with a single compression roller, with a tank (30) comprising a spray gun (31) for powder (32) in which a single cylindrical compression roller (33) is present and showing the angle $\alpha''_1$.

The arrows near the fiber indicate the direction of travel of the fiber.

Figure 4:
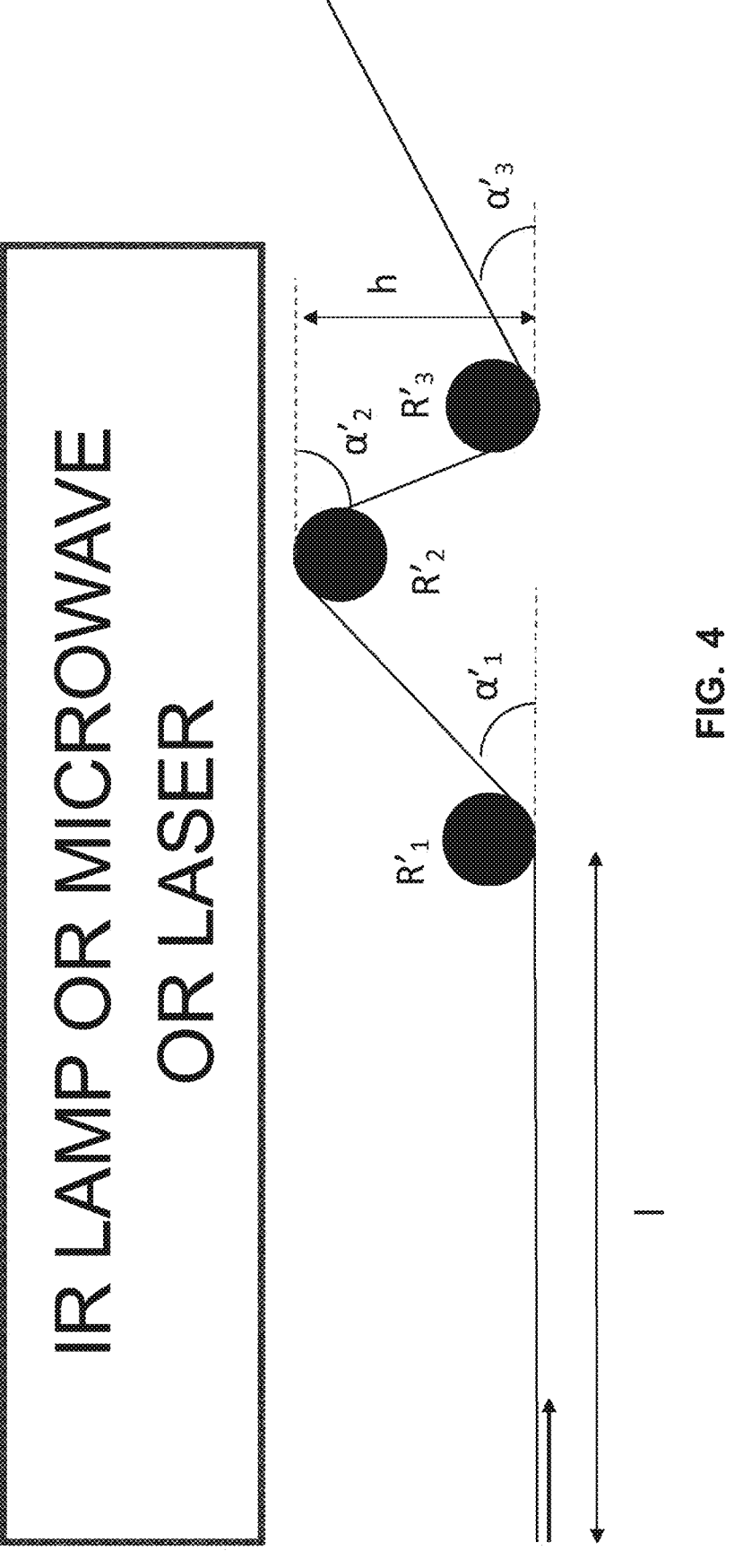

FIG. 4 shows a drawing of a three roller-heating system.

Figure 5:
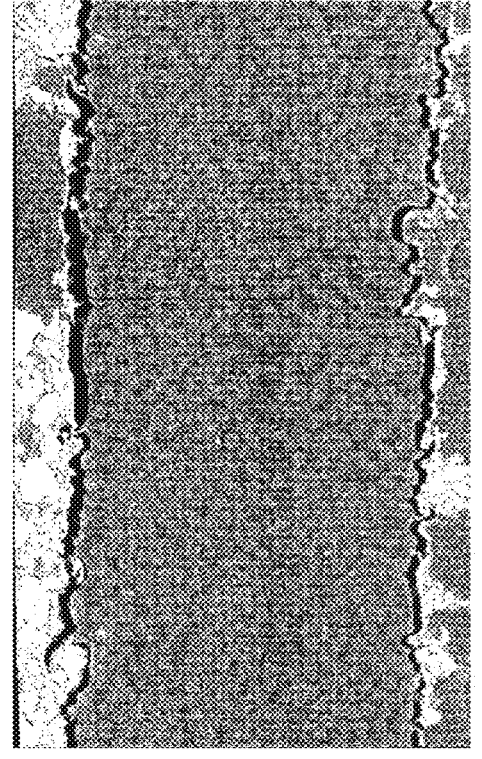

FIG. 5 shows a photo taken with a scanning electron microscope of a cross-section view of a ¼" Toray, 12K T700S 31E carbon fiber roving impregnated by a PA MPMDT/10T nonreactive polymer powder with D50=115 μm according to example 1.

The diameter of one fiber represents 7 μm.

Figure 6:
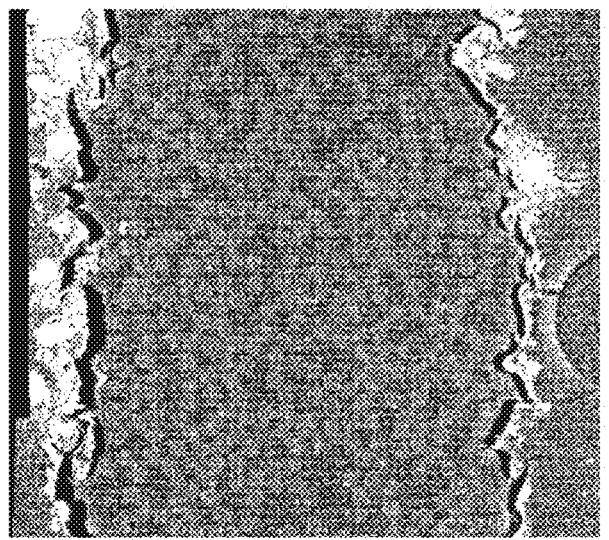

FIG. 6 shows a photo taken with a scanning electron microscope of a cross-section view of a ¼" Toray, 12K T700S 31E carbon fiber roving impregnated by a MPMDT/10T reactive prepolymer powder carrying two NH2 and CO2H co-reactive functions with Tg 125° C. with Mn 5100, then polymerization with a heating system.

The diameter of one fiber represents 7 μm.

The following examples illustrate the scope of the invention, without limitation.

Example 1

Operating mode comprising a step for preimpregnation of a fibrous material (carbon fiber) by a nonreactive polyamide powder in fluidized bed with a sincile roller preceded by supporters upstream from the tank and a step for InfraRed Heating (Comparative Example)

The following operating mode was executed:

Four cylindrical and fixed rollers with 8 cm diameter are present upstream from the tank comprising the fluidized bed and the roving travels over them.

The rollers are 54 cm apart (distance between the first and last roller).

Preimpregnation Step

A cylindrical compression roller $R_1$, 25 cm diameter, in the tank (L=500 mm, W=500 mm, H=600 mm).

0.3 second residence time in the powder

Angle $\alpha_1$ is 25°

Spreading about 100% (or a width multiplied by 2) for a ¼" Toray, 12K T700S 31E carbon fiber roving D50=115 μm, (D10=49 μm, D90=207 μm) for the MPMDT/10T powder.

Edge of the tank equipped with a fixed roller.

The fibrous material (¼" carbon fiber roving) was pre-impregnated by a MPMDT 10T polyamide with particle size defined hereinabove according to the following operating mode:

Heating Step

Figure 1:
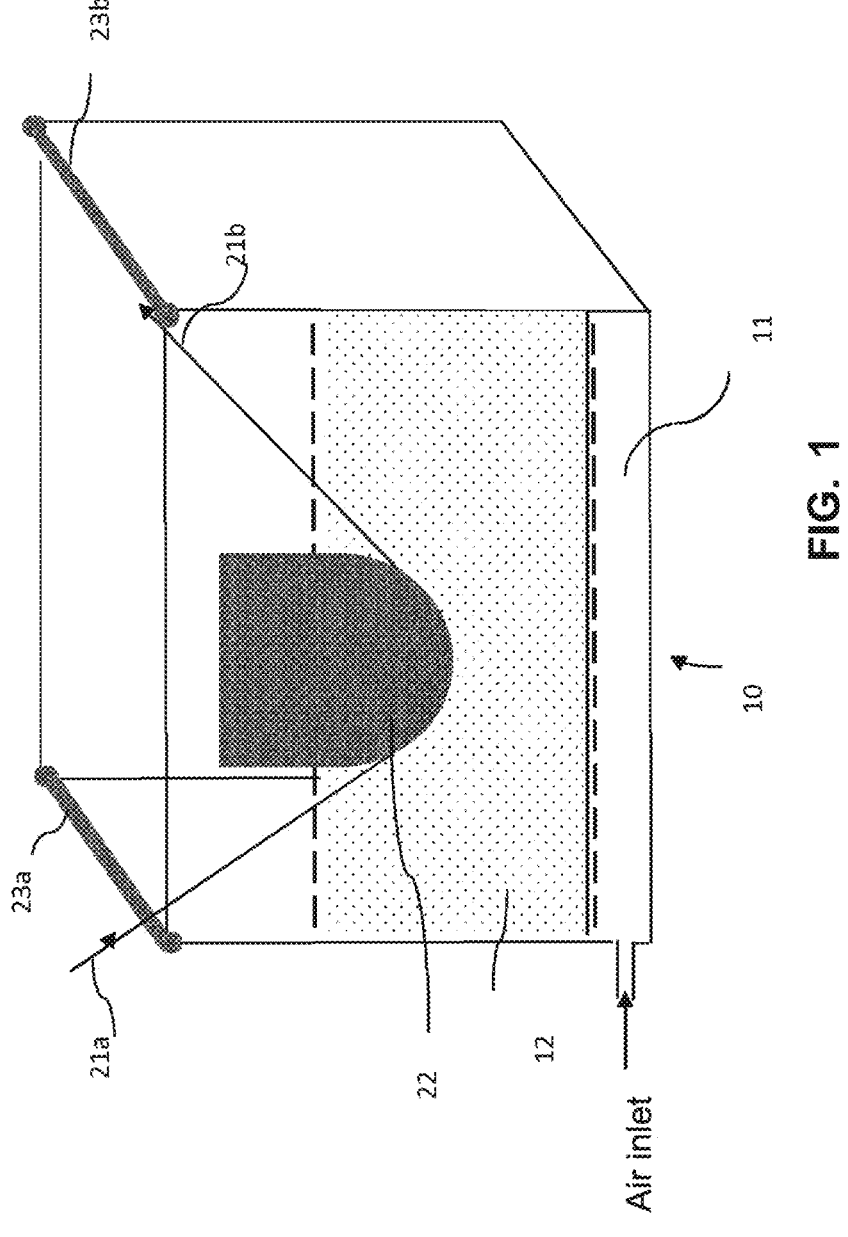
FIG. 1 details a tank (10) comprising a fluidized bed (12) with a supporting part, whose height is adjustable (22). The edge of the tank entry is equipped with a rotating roller 23a on which the roving 21a travels and the edge of the tank exit is equipped with a rotating roller 23b on which the roving 21b travels.
Figure 2:
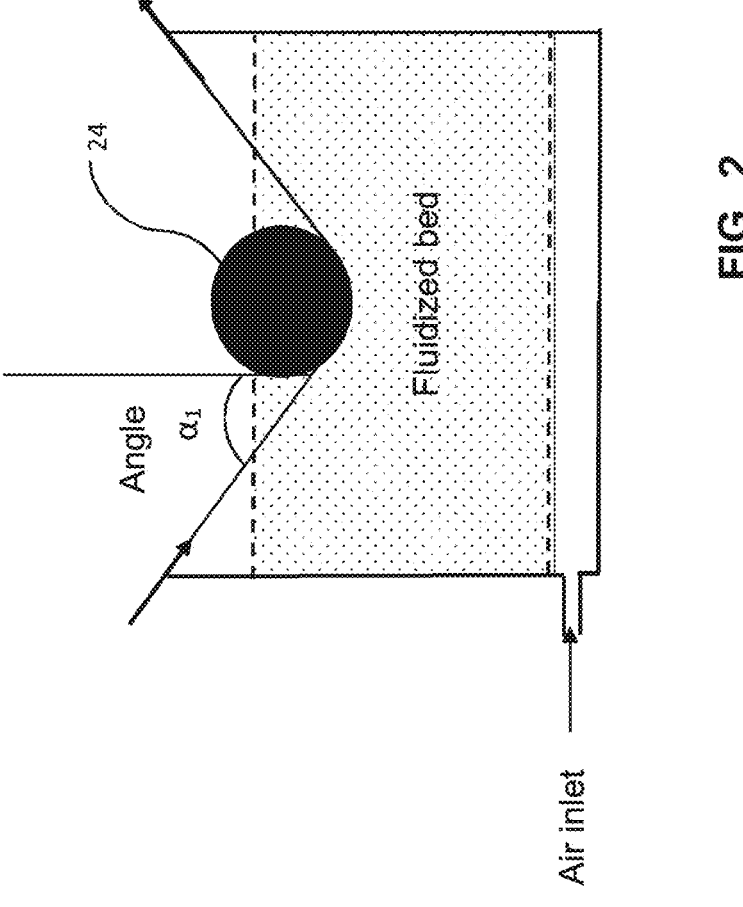
FIG. 2 presents describes an embodiment with a single compression roller, with a tank (10) comprising a fluidized bed (12) in which a single cylindrical compression roller (24) is present and showing the angle $\alpha_1$.

The heating system used is the one described in FIG. 1, but with eight fixed cylindrical rollers $R'_1$ à $R'_8$ with 8 mm diameter.

The feed speed of the roving is 10 m/min.

The infrared used has a power of 25 kW; the height between the infrared and the upper roller is 4 cm and the height between the infrared and the lower rollers is 9 cm.

The angles $\alpha'_1$ to $\alpha'_8$ are identical and are 25°.

The height h is 20 mm

The length l is 1,000 mm

The eight rollers are each 43 mm apart.

Calendaring after the heating step by means of two calendars mounted in series equipped with a 1 kW IR each.

FIG. 5 shows the resulting fibrous material impregnated with MPMDT/10T.

Example 2

Operating mode comprising a step for preimpregnation of a fibrous material (carbon fiber) by a reactive MPMDT/10T prepolymer powder in fluidized bed with a sincile roller preceded by supporters upstream from the tank and a step for InfraRed Heating according to the invention The same operating mode as for example 1 was carried out by using a MPMDT/10T prepolymer carrying two NH2 and CO2H co-reactive functions with Tg 125° C. and Mn 5100.

D50=115 μm, (D10=49 μm, D90=207 μm) for the MPMDT/10T powder.

Edge of the tank equipped with a fixed roller.

The Mn of the MPMDT/10T after passage under the heating system is 16,000.

FIG. 6 shows the resulting fibrous material impregnated with MPMDT/10T prepolymer.

This demonstrates the effectiveness of the impregnation method by a reactive prepolymer powder carrying two NH2 and CO2H co-reactive functions, then polymerization with an infrared heating system.

Example 3

Determination of the porosity level the relative difference between theoretical and experimental density (general method)

a) The required data are:

The density of the thermoplastic matrix

The density of the fibers

The grammage of the reinforcement:

linear density (g/m), for example, for a ¼ inch tape (coming from a single roving)

surface density (g/m$^2$) for example, for a wider tape or fabric b) Measurements to do:

The number of samples must be at least 30 so that the result is representative of the material studied.

The measurements to be done are:

The dimensions of the samples collected:

Length (if the linear density is known).

Length and width (if the surface density is known).

The experimental density of the samples collected:

Mass measurements in air and in water.

The measurement of the fiber level is determined according to ISO 1172:1999 or by thermogravimetric analysis (TGA) such as determined in the document B. Benzler, Applications Laboratory, Mettler Toledo, Giesen, User-Com 1/2001.

The measure of the carbon fiber level can be determined according to ISO 14127:2008.

Determination of the theoretical density from the fiber level:

a) Determination of the theoretical density from the fiber level:

$$\% M f_{th} = \frac{m_l \cdot L}{Me_{air}}$$

where $m_l$ the linear density of the tape,

L the length of the sample, and $Me_{air}$ the mass of the sample measured in air.

The variation of the fiber density level is assumed to be directly related to a variation of the matrix level without considering the variation of the quantity of fibers in the reinforcement.

b) Determination of the theoretical density:

$$d_{th} = \frac{1}{\frac{1 - \% \, Mf_{th}}{d_m} + \frac{\% \, Mf_{th}}{d_f}}$$

where $d_m$ and $d_f$ are the respective densities of the matrix and the fibers.

The theoretical density thus calculated is the achievable density if there are no porosities in the samples.

c) Evaluation of the porosity: The porosity is then the relative difference between theoretical density and experimental density.

The invention claimed is:

1. An impregnated fibrous material comprising a fibrous material made of continuous fibers and at least one reactive thermoplastic prepolymer in a solid state, wherein said at least one reactive thermoplastic prepolymer is partially polymerized without a chain extender and has a number-average molecular weight Mn from 500 to 10,000, the proportion of fibers in said impregnated fibrous material being 45 to 65% by volume, wherein said at least one partially polymerized reactive thermoplastic prepolymer has a molten viscosity of 0.1 to 100 Pa.s, wherein a preimpregnation step is done using an aqueous dispersion of prepolymer particle or an emulsion or aqueous suspension of prepolymer, a fluidized bed or spraying of a nozzle or spray gun by dry route in a tank, excluding a molten route, the fluidized bed having at least one supporting part which includes a compression roller, wherein the at least one reactive thermoplastic prepolymer is selected from: polyaryl ether ketones (PAEK); polyaryl ether ketone ketone (PAEKK); aromatic polyether imides (PEI); polyaryl sulfones; polyarylsulfides; polyamides (PA); PEBAs; polyolefins; and mixtures thereof, wherein said at least one partially polymerized reactive thermoplastic prepolymer comprises at least two polyamide prepolymers that react together and each carry respectively two identical terminal functions X' or Y', where said function X' of a prepolymer can react only with said function Y' of the other prepolymer.

2. The impregnated fibrous material according to claim 1, wherein said at least one thermoplastic prepolymer is selected from polyamides, PEKK, PEI and a mixture of PEKK and PEI.

3. The impregnated fibrous material according to claim 2, wherein said polyamide is selected from aliphatic polyamides, cycloaliphatic polyamides and semi-aromatic polyamides.

4. The impregnated fibrous material according to claim 3, wherein said aliphatic polyamide is selected from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010, polyamide 12/1010, or a mixture thereof or a copolyamide thereof, and block copolymers.

5. The impregnated fibrous material according to claim 1, wherein said at least one reactive thermoplastic prepolymer has a glass transition temperature Tg≥80° C., or a melting temperature Tf≥150° C.

6. The impregnated fibrous material according to claim 1, wherein said fibrous material comprises continuous fibers selected from carbon, glass, silicon carbide, basalt, silica, flax or hemp, lignin, bamboo, sisal, silk, or cellulose, or amorphous thermoplastic fibers with a glass transition temperature Tg higher than the Tg of said prepolymer or said prepolymer mixture when the latter is amorphous or higher than the Tf of said prepolymer or said prepolymer mixture when the latter is semi-crystalline, or the semicrystalline thermoplastic fibers with a melting temperature Tf higher than the Tg of said prepolymer or said prepolymer mixture when the latter is amorphous or higher than the Tf of said prepolymer or said prepolymer mixture when the latter is semi-crystalline, or a mixture of two or more of said fibers.

7. The impregnated fibrous material according to claim 1, wherein said thermoplastic prepolymer further comprises carbonaceous fillers.

8. The impregnated fibrous material according to claim 1, wherein said thermoplastic prepolymer further comprises liquid crystal polymers or cyclic poly(butylene terephthalate), or mixtures containing said liquid crystal polymers or said cyclic poly(butylene terephthalate) as additives.

9. A method for preparing an impregnated fibrous material comprising a fibrous material with continuous fibers and at least one nonreactive thermoplastic polymer, the number-average molecular weight Mn of which is greater than 10,000, the method comprising using the impregnated fibrous material of claim 1.

10. A method of preparing calibrated ribbons suitable for the manufacture of three-dimensional composite parts by automatic application of said ribbons by means of a robot, the method comprising using the fibrous material of claim 1 to prepare the calibrated ribbons.

11. A ribbon comprising at least one fibrous material as defined in claim 1.

12. The ribbon according to claim 11, wherein the ribbon is made of a single unidirectional ribbon or a plurality of parallel unidirectional ribbons.

13. The ribbon according to claim 11, wherein the ribbon has a width (I) and thickness (ep) suitable for robot application in the manufacture of three- dimensional parts, without the need for slitting.

14. The ribbon according to claim 11, wherein the thermoplastic prepolymer is a polyamide prepolymer chosen from an aliphatic polyamide selected from PA 6, PA 11, PA 12, PA 66, PA 46, PA 610, PA 612, PA 1010, PA-1012, PA 11/1010 and PA12/1010, a semi-aromatic polyamide chosen from PA 11/10T, PA 11/6T/10T, PA MXDT/10T, PA MPMDT/10T and PA BACT/10T, PA BACT/6T, PA BACT/ 10T/6T, PA MXD6 and PA MXD10, PEKK and PEI or a mixture of PEKK and PEI.

15. A method of manufacturing three-dimensional composite parts, the method comprising using the ribbon according to claim 11 to manufacture three-dimensional composite parts.

16. The method according to claim 15, wherein said composite parts relates to the fields of transportation, petroleum and gas, gas storage, aeronautics, nautical and rail; renewable energies, energy storage devices, solar panels; thermal protection panels; sports and recreation, health and medical, and electronics.

17. The impregnated fibrous material according to claim 1, wherein said function X' of the prepolymer can react only with said function Y' of the other prepolymer by condensation.

18. The impregnated fibrous material according to claim 17, wherein said function X' of the prepolymer can react only with said function Y' of the other prepolymer with X' and Y' being amine and carboxyl or carboxyl and amine respectively.

*    *    *    *    *